US012669762B2

(12) United States Patent
Tanaka

(10) Patent No.: US 12,669,762 B2
(45) Date of Patent: Jun. 30, 2026

(54) IMAGE FORMING APPARATUS HAVING CHARGING BRUSH WITH CRIMPED AND NON-CRIMPED FIBER

(71) Applicant: CANON KABUSHIKI KAISHA, Tokyo (JP)

(72) Inventor: Hiroki Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/816,050

(22) Filed: Aug. 27, 2024

(65) Prior Publication Data

US 2025/0130515 A1 Apr. 24, 2025

(30) Foreign Application Priority Data

Oct. 24, 2023 (JP) ................................ 2023-182529

(51) Int. Cl.

| | |
|---|---|
| ***G03G 15/02*** | (2006.01) |
| ***A46B 3/00*** | (2006.01) |
| ***A46B 5/00*** | (2006.01) |
| ***A46B 9/06*** | (2006.01) |
| ***A46D 1/00*** | (2006.01) |
| ***A46D 3/00*** | (2006.01) |
| ***G03G 21/12*** | (2006.01) |

(52) U.S. Cl.

CPC .......... *G03G 15/0233* (2013.01); *A46B 3/00* (2013.01); *A46B 5/0025* (2013.01); *A46B 9/06* (2013.01); *A46D 1/0207* (2013.01); *A46D 1/0253* (2013.01); *A46D 3/00* (2013.01); *G03G 21/12* (2013.01); *A46B 2200/405* (2013.01)

(58) Field of Classification Search

CPC ...... G03G 15/0233; G03G 21/12; A46B 3/00; A46B 5/0025; A46B 9/06; A46D 1/0207; A46D 1/0253; A46D 3/00

See application file for complete search history.

(56) References Cited

U.S. PATENT DOCUMENTS 5,652,649 A * 7/1997 Ikegawa ............ G03G 15/0233 399/175
10,101,689 B2 10/2018 Iwasawa et al.
(Continued)

FOREIGN PATENT DOCUMENTS

JP 7-295445 A 11/1995
JP 2007-17804 A 1/2007
(Continued)

*Primary Examiner* — Hoang X Ngo
(74) *Attorney, Agent, or Firm* — Venable LLP

(57) ABSTRACT

An image forming apparatus includes a rotatable photosensitive member and a charging brush. The charging brush forms a charging portion in contact with a surface of the photosensitive member and charges the surface of the photosensitive member. The charging brush is provided with brush fiber including a first type of fiber which is crimped and a second type of fiber which is non-crimped. A ratio of the first type of fiber in the brush fiber in a first portion of the charging brush in a moving direction of the surface of the photosensitive member in the charging portion is higher than the ratio of the first type of fiber in the brush fiber in a second portion of the charging brush positioned further downstream than the first portion in the moving direction.

21 Claims, 12 Drawing Sheets

(56) References Cited

U.S. PATENT DOCUMENTS

| | | | | |
|---|---|---|---|---|
| 2005/0241092 | A1* | 11/2005 | Takesawa | A46B 3/02<br>15/230 |
| 2018/0275553 | A1* | 9/2018 | Iwasaki | G03G 21/1814 |
| 2024/0241464 | A1 | 7/2024 | Tanaka et al. | |

FOREIGN PATENT DOCUMENTS

| | | | |
|---|---|---|---|
| JP | 2008-116575 | A | 5/2008 |
| JP | 2018-10260 | A | 1/2018 |
| JP | 2023-56470 | A | 4/2023 |

* cited by examiner

IMAGE FORMING APPARATUS HAVING CHARGING BRUSH WITH CRIMPED AND NON-CRIMPED FIBER

FIELD OF THE INVENTION AND RELATED ART

The present invention relates to an image forming apparatus which forms an image on a recording material.

In Japanese Patent Application Laid-Open No. 2023-56470, to charge a surface of a photosensitive drum with a charging brush onto which conductive fiber is planted is disclosed. In Japanese Patent Application Laid-Open No. 2007-17804, a charging brush which uses a crimped bristle (yarn) as brush fiber is disclosed.

SUMMARY OF THE INVENTION

To charge a photosensitive drum more uniformly with a charging brush, it is preferable to bring tips of brush fiber uniformly into contact with a surface of the photosensitive drum with small contact pressure. On the other hand, in a case in which foreign matter with relatively a large size, such as paper dust, enters a contacting portion of the charging brush and the photosensitive drum, local charging defect caused by the foreign matter may become apparent as image defect.

An object of the present invention is to provide an image forming apparatus capable of both improving uniformity of charging and suppressing charging defect caused by foreign matter.

In an aspect of the present invention, there is provided an image forming apparatus comprising: a rotatable photosensitive member; and a charging brush configured to form a charging portion by being in contact with a surface of the photosensitive member and to charge the surface of the photosensitive member, wherein the charging brush is provided with brush fiber including a first type of fiber which is crimped and a second type of fiber which is non-crimped, and wherein a ratio of the first type of fiber in the brush fiber in a first portion of the charging brush in a moving direction of the surface of the photosensitive member in the charging portion is higher than the ratio of the first type of fiber in the brush fiber in a second portion of the charging brush positioned further downstream than the first portion in the moving direction.

Further features of the present invention will become apparent from the following description of exemplary embodiments with reference to the attached drawings.

DESCRIPTION OF THE EMBODIMENTS

Hereinafter, Embodiments according to the present invention will be described with reference to the drawings.

(1. Image Forming Apparatus)

Figure 1:
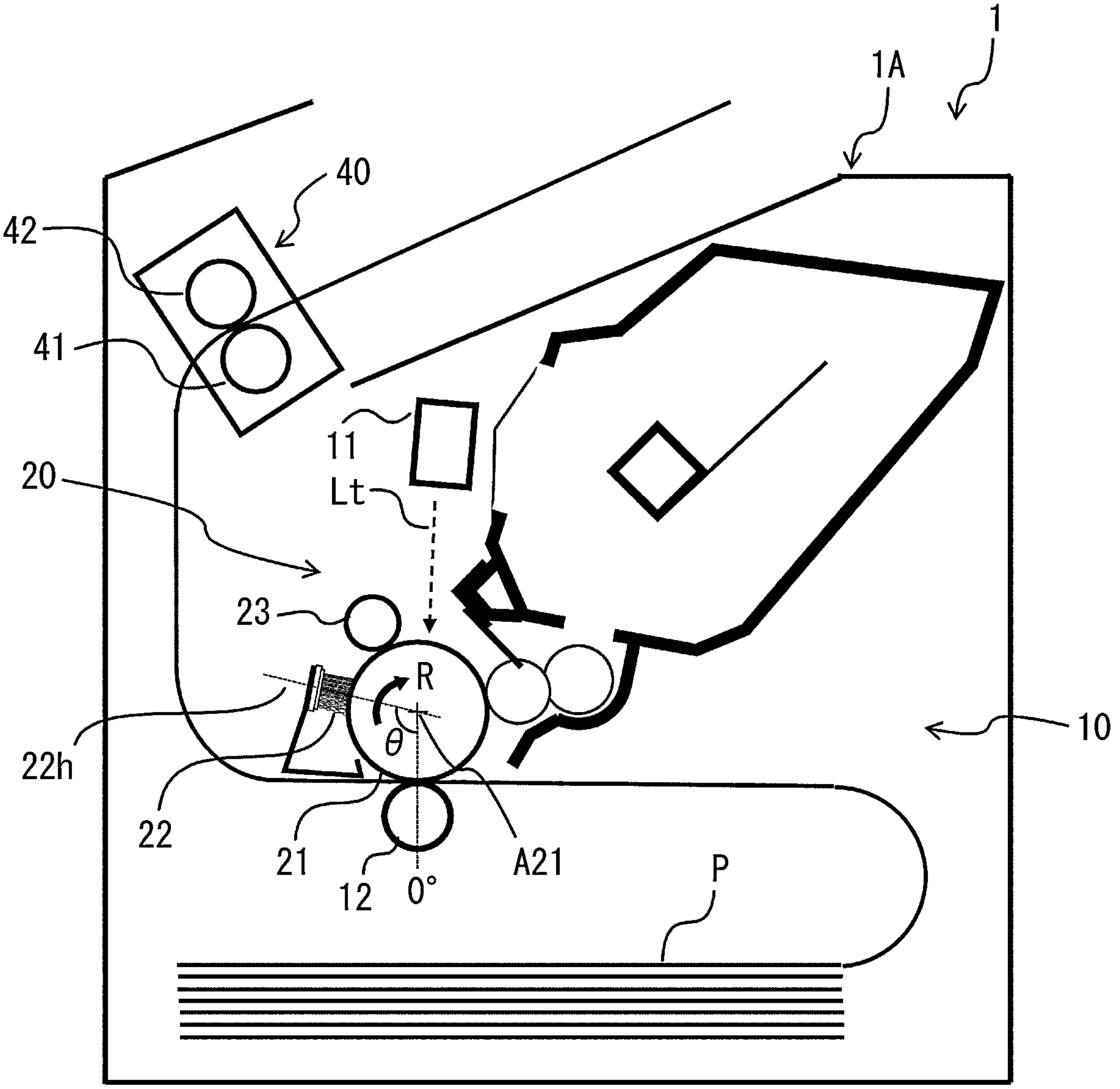
FIG. 1 is a schematic view of an image forming apparatus according to Embodiments.

FIG. 1 is a schematic view illustrating a configuration of an image forming apparatus 1 according to an example (Embodiment 1) of the present Embodiments. The image forming apparatus 1 is a monochrome printer which forms an image on a recording material based on image information input from an external device. Examples of the recording material include a variety of sheet members made of different material, such as a paper such as a plain paper and a thick paper, a plastic film such as a sheet for an overhead projector, a special shaped sheet such as an envelope and an index paper, and cloth.

A monochrome printer is used as an example in the present Embodiment, however, the "image forming apparatus" may be a color printer provided with a plurality of cartridges which use toner of different colors from each other as developer. In addition, the "image forming apparatus" is not limited to a single-function printer equipped with only an image forming function (printing function), but may also be a copy machine equipped with a copy function, or a multifunction machine equipped with a plurality of functions such as a scanner or a facsimile machine.

The image forming apparatus 1 includes an image forming portion 10 which forms a toner image on a recording material P, as shown in FIG. 1. Furthermore, the image forming portion 1 includes a fixing portion 40 which fixes the toner image formed by the image forming portion 10 to the recording material P. The image forming apparatus 1 performs a series of operations (image forming operation, paper passing operation) in which the image is formed on the recording material P by the image forming portion 10 while conveying the recording material P one sheet at a time.

The image forming portion 10 includes an exposing unit 11 as an exposing means, a process cartridge 20 of an electrophotographic type, and a transfer roller 12 as a transfer means which transfers the toner image formed on a photosensitive drum 21 of the process cartridge 20 to the recording material P.

Figure 2:
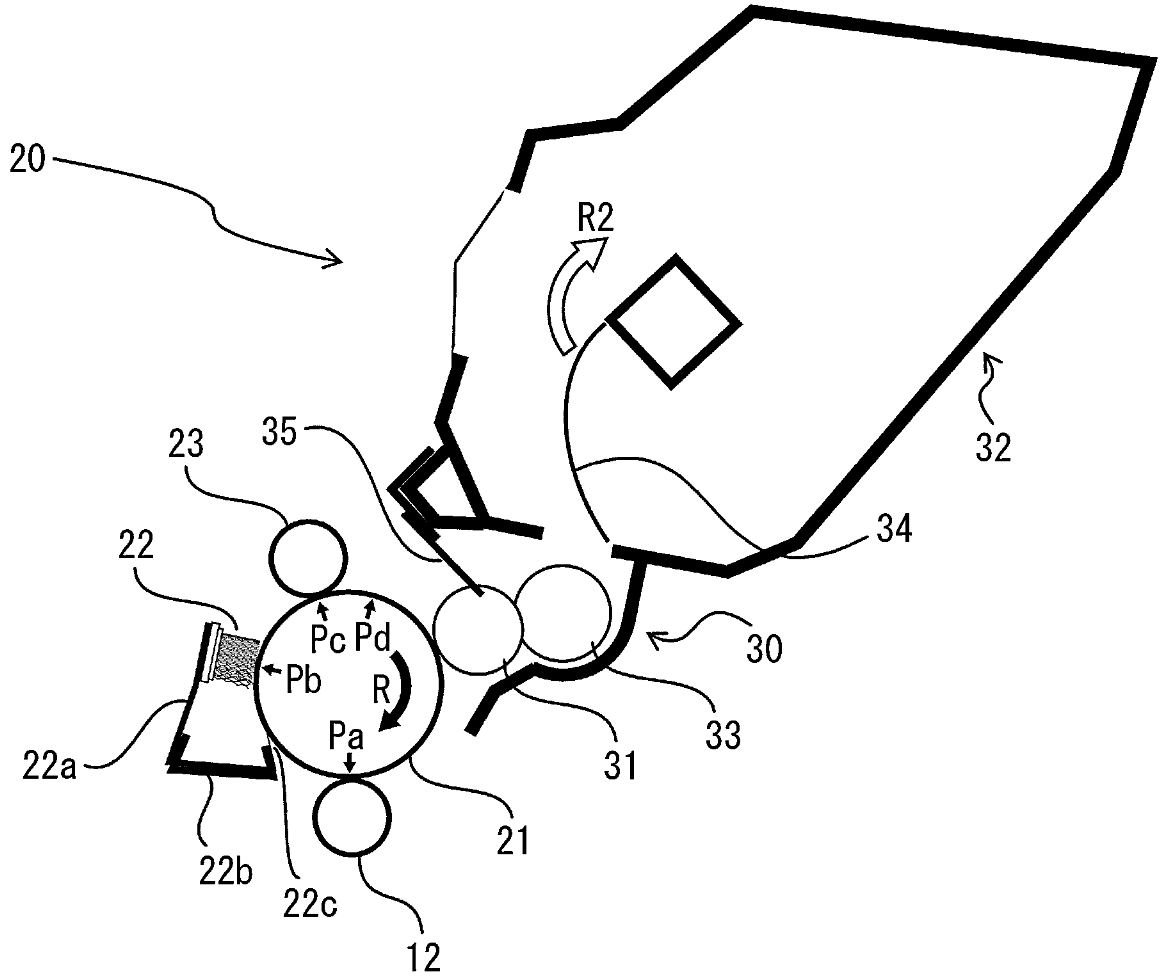
FIG. 2 is a schematic view of a process cartridge according to the Embodiments.

The process cartridge 20 is shown in FIG. 2. The process cartridge 20 is a unit in which the photosensitive drum 21 and at least one of process means which act on the photosensitive drum 21 to perform each process of electrophotographic processes (charging, exposing, developing, transferring, fixing, cleaning, etc.) are integrated. The process cartridge 20 is mountable to and demountable from a main body 1A of the image forming apparatus 1. Incidentally, the main body 1A in the present Embodiment is what excludes the process cartridge 20 from the image forming apparatus 1.

The process cartridge 20 in the present Embodiment includes the photosensitive drum 21, a charging brush 22, a charging roller 23, and a developing device 30 including a developing roller 31. The charging brush 22, the charging roller 23 and the developing device 30 are all examples of the process means and are disposed around the photosensitive drum 21. As an area in which the photosensitive drum 21 and the transfer roller 12 opposing to each other, a transfer portion Pa (transfer nip portion) in which transfer of the toner image is performed is formed.

The photosensitive drum 21 is a photosensitive member molded in a cylindrical shape (drum shape). The photosensitive drum 21 functions as an image bearing member which bears a latent image and the toner image. In the image forming operation, the photosensitive drum 21 is rotationally driven by a driving motor 110 (FIG. 4) in a predetermined direction (clockwise direction in FIG. 2) at a predetermined peripheral speed (called as a process speed).

The image forming apparatus 1 in the present Embodiment has a print speed of 30 sheets per minute and a process speed of 170 mm/sec upon continuously passing through the recording material P of A4 size.

The charging brush 22 and the charging roller 23 are pressed against a surface of the photosensitive drum 21 with predetermined pressure contact force. A contacting portion of the charging brush 22 and the photosensitive drum 21 is a brush charging portion Pb (first charging portion) in which charging of the surface of the photosensitive drum 21 is performed. A contacting portion of the charging roller 23 and the photosensitive drum 21 is a charging portion Pc (second charging portion) in which the charging of the surface of the photosensitive drum 21 is performed. In a rotational direction R of the photosensitive drum 21, both the first charging portion and the second charging portion are disposed downstream of the transfer portion and upstream of an exposing position Pd where a light from the exposing unit 11 is irradiated onto the photosensitive drum 21. In the rotational direction R of the photosensitive drum 21, the brush charging portion Pb, which is the contacting portion of the charging brush 22 and the photosensitive drum 21, is disposed downstream of the transfer portion Pa and upstream of the charging portion Pc of the charging roller 23.

The charging roller 23 (roller member) is an example of a charging means which further charges the surface of photosensitive drum 21 downstream of the charging brush 22. Instead of the charging roller 23, for example, a corona charger which charges the surface of the photosensitive drum 21 by corona electric discharge may be disposed.

To the charging brush 22 and the charging roller 23, predetermined charging voltage for charging the surface of the photosensitive drum 21 is applied, respectively, from a power source of a high voltage substrate provided to the image forming apparatus 1. An absolute value of the charging voltage applied to the charging brush 22 is smaller than an absolute value of the charging voltage applied to the charging roller 23.

Figure 4:
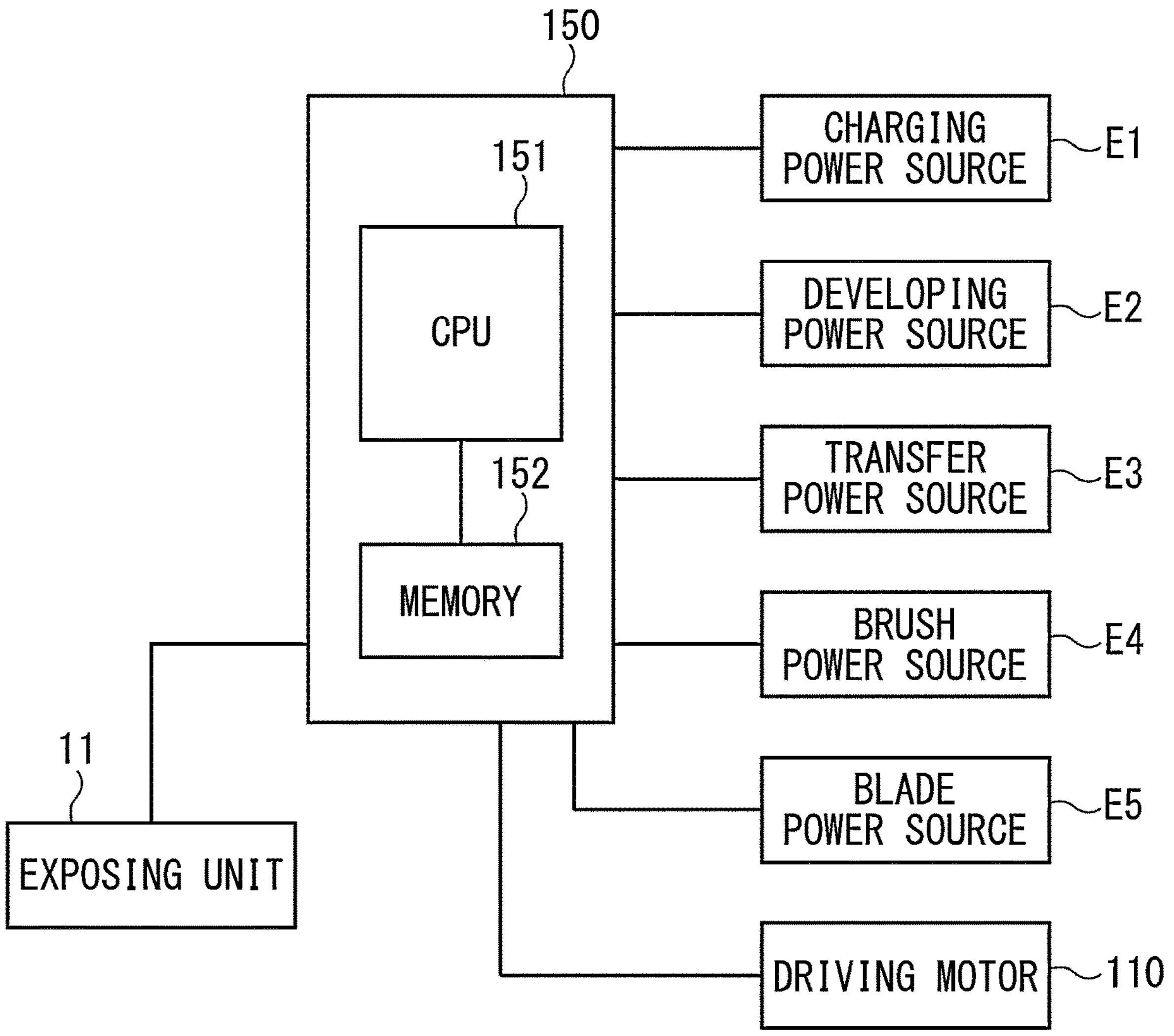
FIG. 4 is a control block diagram according to the Embodiments.

A control block diagram of the image forming apparatus 1 is shown in FIG. 4. Brush voltage is applied to the charging brush 22 from a brush power source E4, and charging roller voltage is applied to the charging roller 23 from a charging power source E1.

By the predetermined voltage being applied to the charging brush 22 and the charging roller 23, the surface of the photosensitive drum 21 is uniformly charged to predetermined potential. In the present Embodiment, the surface of the photosensitive drum 21 is charged by the charging roller 23 to final potential before exposure (potential suitable for the image formation through the exposing and the developing) after being charged by the charging brush 22 in auxiliary manner. In other words, surface potential of the photosensitive drum 21 (drum surface potential) is raised in steps from potential immediately after passing through the transfer portion by the charging by the charging brush 22 and the charging roller 23. In the present Embodiment, the drum surface potential is finally charged to −500 V by the charging roller 23. Incidentally, the charging of the photosensitive drum 21 by the charging brush 22 and the charging roller 23 will be described in detail in "5. Charging configuration".

The exposing unit 11 scans and exposes the surface of the photosensitive drum 21 by irradiating the photosensitive drum 21 with a laser beam Lt corresponding to the image information input from the external device using a polygon mirror. By this exposure, an electrostatic latent image corresponding to the image information is formed on the surface of the photosensitive drum 21. Incidentally, the exposing unit 11 is not limited to a laser scanner device but, for example, an LED exposing device including LED arrays in which a plurality of LEDs are arranged along a longitudinal direction of the photosensitive drum 21 may be employed. In the present Embodiment, by the laser exposure of the exposing unit 11, the drum surface potential in a solid black portion (exposed portion, printing portion) is decreased to −50 V (light portion potential).

Next, the process cartridge 20 will be described. The process cartridge 20 includes the developing device 30. The developing device 30 is provided with the developing roller 31 as a developing member (developer carrying member) which carries and supplies the developer to the photosensitive drum 21, a developer container 32 which serves as a frame member of the developing device 30, and a supplying roller 33 which supplies the toner to the developing roller 31. The developing roller 31 and the supplying roller 33 are rotatably supported by the developer container 32. In addition, the developing roller 31 is disposed in an opening portion of the developer container 32 so as to face the photosensitive drum 21. The supplying roller 33 is rotatably in contact with the developing roller 31, and the toner accommodated in the developer container 32 is applied to a surface of the developing roller 31 by the supplying roller 33.

The developing device 30 in the present Embodiment uses a contact developing type as a developing type. That is, a toner layer carried on the developing roller 31 is in contact with the photosensitive drum 21 in a developing portion (developing area) in which the photosensitive drum 21 and the developing roller 31 opposing each other. Developing voltage is applied to the developing roller 31 from a developing power source E2 (FIG. 4), which is a developing voltage applying portion. Under a condition in which the developing voltage is applied, by the toner carried by the developing roller 31 being transferred from the developing roller 31 to the surface of the photosensitive drum 21 according to potential distribution on the surface of the photosensitive drum 21, the electrostatic latent image is developed into the toner image.

In the present Embodiment, the developing voltage is set to −300 V. Incidentally, in the present Embodiment, a reverse developing type is employed. That is, after the surface of the photosensitive drum 21 is charged in the charging process, the surface of the photosensitive drum 21 is exposed in the exposing process, and by the toner being adhered to the exposed area, which is the surface of the photosensitive drum 21 where an amount of electric charge is attenuated, the toner image is formed. The electric charge applied to the surface of the photosensitive drum 21 in the charging process is the same as normal polarity of the toner. The developing voltage is set so that potential in the exposed area of the photosensitive drum 21 (light portion potential) is opposite polarity to the normal polarity of the toner relative to the developing voltage, and potential in a non-exposed area of the photosensitive drum 21 (dark portion potential) is the same polarity as the normal polarity of the toner relative to the developing voltage.

In addition, in the present Embodiment, toner with a particle diameter being 7 μm and the normal polarity being negative polarity can be used. For the toner, as an example, a polymerized toner manufactured by polymerization method is employed.

The toner does not contain a magnetic component, and is a so-called non-magnetic one-component developer, in which the toner is carried by the developing roller 31 mainly by intermolecular force or electrostatic force (mirror image force).

In a toner particle, a plurality of waxes to adjust melting characteristics of the toner during a fixing process and adhesion thereof to a recording medium and a fixing member. On a surface of the toner particle, a fine particle constituted by a silica particle having a particle diameter of submicron order to adjust fluidity and charging performance of the toner may be added. In the present Embodiment, the toner, in which the wax and/or the fine particle are added to the toner particle as needed, as the developer is used.

In the present Embodiment, an example in which a non-magnetic one-component developer is used will be described, however, as the developer, a one-component developer containing a magnetic component may also be used. In addition, a two-component developer, which is constituted by a non-magnetic toner and a carrier having magnetic properties may be used as the developer. In a case in which a developer having the magnetic property is used, as a developer carrying member, for example, a cylindrical developing sleeve, inside which a magnet is provided, may be used.

Inside the developer container 32, a stirring member 34 is provided as a stirring means. By the stirring member 34 being rotated in a predetermined rotational direction R2 by being driven by the driving motor 110 (FIG. 4), the stirring member 34 stirs the toner in the developer container 32 and bring the toner toward the developing roller 31 and the supplying roller 33. In addition, the stirring member 34 is served to circulate the toner, which is not used for the development and is scraped from the developing roller 31, in the developer container 32, and level the toner in the developer container 32.

In addition, a developing blade 35 which regulates an amount of the toner carried by the developing roller 31 is disposed in the opening portion of the developer container 32 where the developing roller 31 is disposed. The developing blade 35 is formed, for example, of a stainless steel sheet metal. To the developing blade 35, voltage of which an absolute value is greater by 200 V on a negative polarity side relative to the developing voltage is applied from a blade power source E5 (FIG. 4) as a developing blade voltage applying portion. In other words, the voltage which is 200 V greater on a normal polarity side of the toner is applied to the developing blade 35.

The toner supplied to the developing roller 31 is made into a thin layer having a uniform thickness by being passed through an opposing portion with the developing blade 35 by following rotation of the developing roller 31 in a state of being carried on the surface of the developing roller 31. At the same time, the toner is charged to the negative polarity, which is the normal polarity, by triboelectric charging due to rubbing against the developing blade 35 and by direct injection charging due to potential difference formed between the developing blade 35 and the developing roller 31.

To the transfer roller 12, voltage (transfer voltage) of the opposite polarity to the normal polarity of the toner is applied by a transfer power source E3 (FIG. 4).

The fixing portion 40 is what of thermal fixing type which performs a fixing process of the image by heating and melting the toner on the recording material. The fixing portion 40 includes a cylindrical fixing film 41, a heater such as a ceramic heater which heats the fixing film 41, a thermistor which measures temperature of the fixing heater, and a pressing roller 42 which is in pressure contact with the fixing film 41. Incidentally, the flexible fixing film 41 is an example of a fixing member (heating member), and a rigid fixing roller may be used as the fixing member (heating member). In addition, the ceramic heater is an example of a heating means which heats the fixing member (heating member), and a halogen lamp or a coil unit which makes a conductive layer in the fixing member (heating member) generate heat with induction heating may also be used as the heating means.

Incidentally, in the present Embodiment, the photosensitive drum 21, the charging brush 22 and the charging roller 23 are provided to the process cartridge 20, which is mountable to and demountable from the main body 1A of the image forming apparatus 1, however, arrangement of the components is not limited thereto. For example, the developing device 30 may be a unit (developing cartridge), which is mounted to and demounted from the main body 1A independently from the process cartridge 20 (drum cartridge) including the photosensitive drum 21, the charging brush 22 and the charging roller 23. In addition, the image forming apparatus 1 may have a configuration which does not include the mountable and demountable process cartridge 20, but the photosensitive drum 21 and the charging brush 22 are assembled to the main body 1A in a manner in which mounting and demounting thereof by a user is not assumed.

(2. Control System)

FIG. 4 is a schematic block diagram illustrating a control system of the image forming apparatus 1 in the present Embodiment. In the image forming apparatus 1, a control portion 150 is provided. The control portion 150 includes a CPU 151, which executes a calculation process, a memory (storage element) 152 such as a ROM and a RAM as a storage means, and an input/output portion (not shown) which controls a sending and receiving of signals between various elements connected to the control portion 150. In the RAM, a detection result of a sensor, a calculation result, etc. are stored, and in the ROM, a control program, a data table calculated in advance, etc. are stored. The CPU 151 controls each portion of the image forming apparatus 1 by reading out and executing the control programs from the memory 152.

The control portion 150 is a control means which comprehensively controls the operations of the image forming apparatus 1. The control portion 150 executes a predetermined image forming sequence by controlling sending and receiving of various electrical information signals and timings of driving, etc. To the control portion 150, each portion of the image forming apparatus 100 is connected. For example, in relation to the present Embodiment, to the control portion 150, the charging power source E1, which is a second charging power source, the developing power source E2, the transfer power source E3, the brush power source E4, which is a first charging power source, the blade power source E5, the exposing unit 11, the driving motor 110, etc. are connected.

(3. Image Forming Operation)

Next, the image forming operation of the image forming apparatus 1 will be described using FIG. 1 and FIG. 2. When a command for image formation is input to the image forming apparatus 1, an image forming process by the image forming portion 10 is started based on the image information input from an external computer connected to the image forming apparatus 1. In the image forming process, the photosensitive drum 21 is rotatably driven at the process speed by the driving motor 110. The charging brush 22 and the charging roller 23 uniformly charge the surface of the photosensitive drum 21 in the charging portion. The exposing unit 11 irradiates the laser light Lt toward the photosensitive drum 21 to form the electrostatic latent image on the photosensitive drum 21 based on the input image information. The developing roller 31 supplies the toner to the photosensitive drum 21 in the developing portion to develop the electrostatic latent image into the toner image.

In parallel with the image forming process, the recording material P accommodated in an accommodating portion (feeding cassette), which is provided in a lower portion of the main body 1A, is fed one sheet at a time by a feeding member such as a feeding roller. Conveyance of the recording material P is controlled so that a timing of the recording material P entering the transfer portion and a timing of the toner image formed on the photosensitive drum 21 reaching the transfer portion are synchronized. Due to an electric field formed in the transfer portion by the application of the transfer voltage to the transfer roller 12, the toner image is transferred from the photosensitive drum 21 to the recording material P while the recording material P passes through the transfer portion.

The recording material P which has passed through the transfer portion is conveyed to the fixing portion 40, and the toner image is heated and pressed as the recording material P passes through a nip portion between the fixing film 41 and the pressing roller 42 in the fixing portion 40. As a result, by the toner particles being melted and then solidly fixed, the toner image is fixed on the recording material P. The recording material P which has passed through the fixing portion 40 is discharged and stacked outside the image forming apparatus 1.

(4. Collection of Transfer Residual Toner)

In the present Embodiment, a so-called cleaner-less configuration (simultaneous development and cleaning) is employed, in which transfer residual toner which remains on the photosensitive drum 21 for not being transferred to the recording material P is collected in the developing device 30 and reused for the development. The transfer residual toner is the developer remaining on the surface of the photosensitive member after passing through the transfer portion. The transfer residual toner is reused through the following processes.

In the transfer residual toner, the toner charged to the positive polarity, which is reverse polarity to the normal polarity in the present Embodiment, and the toner charged to the negative polarity but does not have sufficient electric charge are mixed. To the charging brush 22, charging voltage greater on the negative polarity side than the surface of the photosensitive drum 21 is applied, and the charging brush 22 charges the surface of the photosensitive drum 21 in auxiliary manner. Hereinafter, the charging process of the photosensitive drum 21 by the charging brush 22 in the present Embodiment is referred to as auxiliary charging.

By the auxiliary charging by the charging brush 22, electric charge of the negative polarity is injected to the transfer residual toner, which is charged to the positive polarity, and also to the toner, which does not have sufficient electric charge of the negative polarity. As a result, the transfer residual toner passes through the contacting portion of the charging brush 22 and the photosensitive drum 21 and the contacting portion of the charging roller 23 and the photosensitive drum 21 by following the rotation of the photosensitive drum 21 in a state in which the transfer residual toner has sufficient electric charge of the negative polarity. Upon passing through, since the transfer residual toner has sufficient electric charge of the negative polarity, it is not likely for the transfer residual toner to adhere to the charging brush 22 and the charging roller 23, to which the charging voltage of the negative polarity is applied. As a result, it becomes possible for the charging brush 22 and the charging roller 23 to maintain good charging performance over a longer period of time.

The transfer residual toner adhered on the surface of the photosensitive drum 21 which has passed through the contacting portion of the charging brush 22 and the charging roller 23 reaches the developing portion as the photosensitive drum 21 rotates. Behavior of the transfer residual toner which reaches the developing portion will be described separately for the exposed portion and a non-exposed portion of the photosensitive drum 21.

In the non-exposed portion of the photosensitive drum 21, i.e., an area in which the drum surface potential is dark portion potential Vd, the drum surface potential is the negative polarity relative to the developing voltage applied to the developing roller 31. Therefore, the transfer residual toner, which has sufficient electric charge of the negative polarity, is moved from the photosensitive drum 21 to the developing roller 31 by Coulomb force generated by an electric field formed between the developing roller 31 and the photosensitive drum 21, and collected in the developer container 32. Incidentally, the non-exposed portion of the photosensitive drum 21 is not limited to an area which is not irradiated by a light at all, but may be an area which is irradiated by a weak light as long as the drum surface potential is the negative polarity relative to the developing voltage. The toner collected in the developer container 32 is agitated with the toner previously accommodated in the developer container 32 by the stirring member 34 and dispersed, and is used again in the developing process by being borne on the developing roller 31.

On the other hand, in the exposed portion of the photosensitive drum 21, i.e., an area in which the drum surface potential is light portion potential Vl, the drum surface potential is positive polarity relative to the developing voltage applied to the developing roller 31. Therefore, the transfer residual toner, which has sufficient electric charge of the negative polarity, does not move to the developing roller 31 but remains on the photosensitive drum 21, forming the toner image together with the toner which has moved from the developing roller 31 to the exposed portion. The transfer residual toner in the exposed portion is then transferred from the photosensitive drum 21 to the recording material P in the transfer portion as a part of the toner image.

In the present Embodiment, the dark portion potential Vd is set to −500 V and the light portion potential Vl is set to −50 V. As described above, since the developing voltage is −300 V, back contrast, which is a potential difference between the dark portion potential Vd of the photosensitive drum 21 (drum surface potential after the charging process by the charging roller 23) and the developing voltage, is Δ200 V. In addition, developing contrast, which is a potential difference between the light portion potential Vl of the photosensitive drum 21 and the developing voltage, is Δ250 V.

(5. Charging Configuration)

Details of the charging brush 22 and the charging roller 23 in the present Embodiment will be described.

As shown in FIG. 2, the charging brush 22 is disposed upstream of the transfer roller 12 and downstream of the charging roller 23 in the rotational direction R of the photosensitive drum 21.

The charging brush 22 is held by a brush holding sheet 22*a*. The brush holding sheet 22*a* is mounted on a frame member 22*b* of the process cartridge 20. In addition, a blowout preventing sheet 22*c* is mounted on the frame member 22*b*. The charging brush 22, the brush holding sheet 22*a*, the frame member 22*b* and the blowout preventing sheet 22*c* form one unit (charging brush unit) which acts on the photosensitive drum 21.

The brush holding sheet 22*a* is a flexible sheet member made of, for example, PET (polyethylene terephthalate). The brush holding sheet 22*a* is mounted on the frame member 22*b* with an adhesive, a double-sided tape, etc. The charging brush 22 is fixed on the brush holding sheet 22*a* using, for example, a double-sided tape. The charging brush 22 is brought into contact with the surface of the photosensitive drum 21 at a predetermined contact pressure by flex of the brush holding sheet 22*a*. The brush holding sheet 22*a* in the present Embodiment uses PET having a thickness of 50 μm, however, other sheet members such as a stainless steel sheet (thin SUS plate) may be used. A holding member which holds the charging brush 22 preferably has adequate flexibility and is preferably what allows the charging brush 22 to be in contact with the surface of the photosensitive drum 21 with appropriate contact pressure by flex thereof. In addition, the holding member which holds the charging brush 22 may have conductivity.

The blowout preventing sheet 22*c* is a resin sheet, for example, having a thickness of 30 μm. The blowout preventing sheet 22*c* is attached to the frame member 22*b* with an adhesive, etc. and is in contact with the surface of the photosensitive drum 21 at a different position from the charging brush 22 in the rotational direction R of the photosensitive drum 21. The blowout preventing sheet 22*c* is in contact (side contact) with the surface of the photosensitive drum 21 at a predetermined penetrating amount against the surface of the photosensitive drum 21 and with an area other than a tip of the blowout preventing sheet 22*c*. The penetrating amount is a dimension of the blowout preventing sheet 22*c* penetrating inside a virtual cylindrical surface corresponding to the surface of the photosensitive drum 21 under an assumption that there is no photosensitive drum 21.

As viewed in a direction of a rotational axis of the photosensitive drum 21, the charging brush 22, the brush holding sheet 22*a*, the frame member 22*b* and the blowout preventing sheet 22*c* form a closed space below the charging brush 22 in a direction of gravity (downward in FIG. 2). By foreign matter such as paper dust which is blocked by the charging brush 22 being accommodated in this closed space, it becomes possible to prevent the foreign matter from scattering into an inside of the image forming apparatus 1. In other words, the brush holding sheet 22*a*, the frame member 22*b*, and the blowout preventing sheet 22*c* form an accommodating portion, which accommodates the foreign matter collected from the photosensitive drum 21 by the charging brush 22, in an upstream side of the charging brush 22 in the rotational direction R of the photosensitive drum 21. The accommodating portion may be formed only by the frame member 22*b*, for example.

Figure 11:
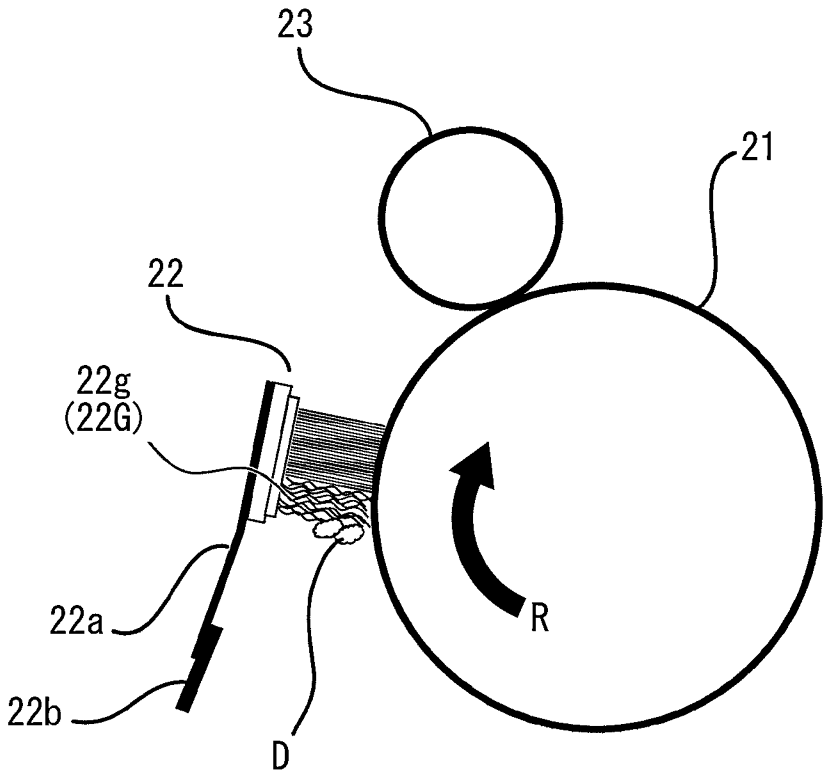
FIG. 11 is an explanatory view of a charging brush according to a Modified Example.

Incidentally, in the present Embodiment, the configuration in which the charging brush unit includes the accommodating portion which accommodates the foreign matter and the blowout preventing sheet 22*c* is provided in the accommodating portion will be described, however, the blowout preventing sheet 22*c* may not be provided in the accommodating portion or it may be a configuration in which the charging brush unit does not include the accommodating portion. For example, as shown in FIG. 11, a space in the upstream side of the charging brush 22 in the rotational direction R of the photosensitive drum 21 may be an open space. In a Modified Example in FIG. 11, foreign matter D which reaches the charging brush 22 is held in a state in which the foreign matter D is entangled by a portion of the charging brush 22 (e.g., a crimped brush portion 22G made of a crimped bristles 22*g*, which will be described below). In a case in which the foreign matter D is unlikely to be scattered, such as a case in which a service life of the process cartridge 20 is relatively short and the charging brush 22 is capable of holding the foreign matter D throughout the service life, it may be a configuration in which the charging brush unit does not include the accommodating portion.

Figure 3:
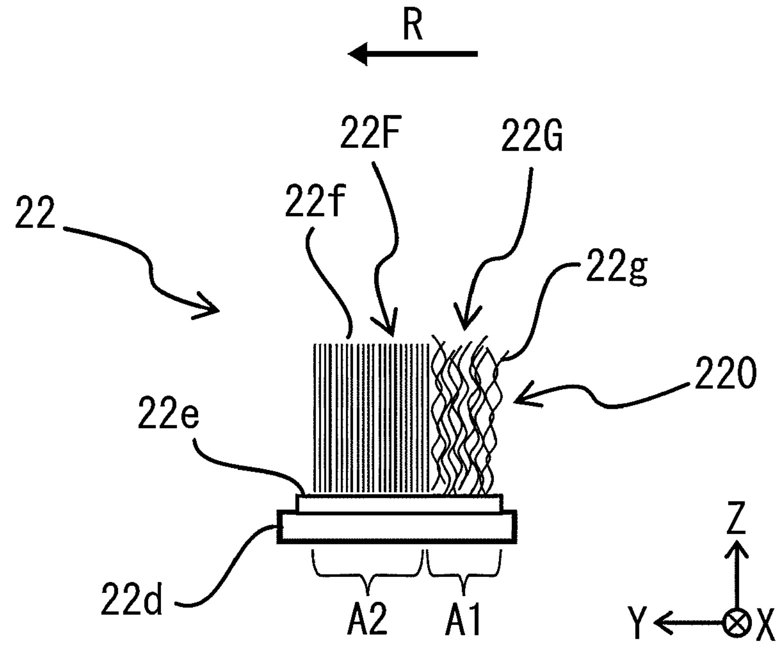
FIG. 3 is a schematic view of a charging brush according to the Embodiments.

As shown in FIG. 3, the charging brush 22 includes a brush main body 220 and a base sheet metal 22*d* as a supporting member which supports the brush main body 220. The brush main body 220 includes a base fabric 22*e* and a plurality of brush fiber (22*f*, 22*g*) planted onto the base fabric 22*e*. The base sheet metal 22*d* is, for example, a stainless steel sheet metal having a thickness of 1 mm. The base fabric 22*e* is a woven fabric including warp yarn and weft yarn and is attached to the base sheet metal 22*d*. In the present Embodiment, as the brush fiber, two types of pile yarn (22*f*, 22*g*) are used. The pile yarn (22*f*, 22*g*) are woven into the base fabric 22*e* by pile weaving and raised in a direction perpendicular to the base fabric 22*e*.

Hereinafter, the direction perpendicular to the base fabric 22*e* and in which the pile yarn (22*f*, 22*g*) are raised is referred to as a Z direction or a brush height direction. A direction perpendicular to the Z direction and in which the base fabric 22*e* is elongated and extended is referred to as an X direction or a longitudinal direction of the charging brush 22. A direction perpendicular to both the X direction and the Z directions is referred to as a Y direction or a widthwise direction of the charging brush 22. The X direction (longitudinal direction) is substantially the same direction as the direction of the rotational axis of the photosensitive drum 21 in a state in which the charging brush 22 is mounted on the image forming apparatus 1. In addition, the Y direction (widthwise direction) is a direction along a moving direction of the surface of the photosensitive drum 21 in the contacting portion of the charging brush 22 and the photosensitive drum 21, and is a direction facing downstream side of the rotational direction R of the photosensitive drum 21. In the description below, the arrangement of the components, etc. with reference to the rotational direction R of the photosensitive drum 21 can be rephrased by the Y direction (widthwise direction) of the charging brush 22 as a reference.

The charging brush 22 in the present Embodiment includes, as the brush fiber (brush bristle), two types of the pile yarn of a straight bristle 22*f* and the crimped bristle 22*g*.

In other words, the charging brush 22 is provided with the brush fiber including a first type of fiber which is crimped (crimped bristle 22*g*) and a second type of fiber which is non-crimped (straight bristle 22*f*). In the present Embodiment, as a method for planting the brush fiber onto the base fabric 22*e*, the pile weaving is used, however, other planting methods such as electrostatic planting, for example, may also be employed.

A length of the charging brush 22 in the X direction (longitudinal direction) is, for example, 235 mm. The length of the charging brush 22 in the X direction can be changed, for example, according to a range in the longitudinal direction through which the recording material P having a maximum width, onto which the image forming apparatus 1 is capable of forming the image, passes (maximum paper passing area). Since the paper dust is generated mainly in the contact portion between the photosensitive drum 21 and the recording material P, the length of charging brush 22 is preferably the width of the maximum paper passing area or more.

The straight bristle 22*f* is conductive fiber. The straight bristle 22*f* is, for example, a pile yarn made of 6-nylon in which carbon of conductivity particles is dispersed. As a pile yarn, synthetic resin such as polyester and acrylic resin may be used in addition to the 6-nylon. As the conductivity particles, nickel, tin oxide, etc. may be used in addition to carbon.

A fiber diameter of the straight bristle 22*f* is preferably from 5 μm to 80 μm, more preferably from 10 μm to 20 μm. In the present Embodiment, the fiber diameter of the straight bristle 22*f* is 15 μm and fineness thereof is 2 denier. Fiber density of the straight bristle 22*f* is preferably from 50 KF (kilofilaments)/inch$^2$ to 400 KF/inch$^2$, and more preferably from 100 KF/inch$^2$ to 300 KF/inch$^2$. In the present Embodiment, the fiber density of the straight bristle 22*f* is 240 KF/inch$^2$. Incidentally, in a case of pile-woven, the fiber density of the brush fiber represents a number of brush fiber planted onto per unit area of the base fabric 22*e* at a root portion of a plant of the brush fiber, and is different from apparent fiber density in the contacting portion of the charging brush 22 and the photosensitive drum 21.

Incidentally, as a unit for the fiber density of the brush fiber, KF/inch$^2$ (number of fiber per square inch. 1 KF is 1000 brush fiber) is used, however, since 1 inch$^2$ is approximately 645 mm$^2$, the unit of fiber density can be converted as 645 KF/inch$^2$=1 KF/mm$^2$.

After the straight bristles 22*f* are woven into the base fabric 22*e*, processes such as raising and shirring are applied to the straight bristles 22*f* and cut to a pre-set brush height. The brush height is preferably from 3 mm to 9 mm, and more preferably from 4 mm to 7 mm. In the present Embodiment, the brush height including the base sheet metal 22*d*, the base fabric 22*e* and the pile yarn (22*f*, 22*g*) is 6 mm. Since a thickness of the base sheet metal 22*d* is 1 mm and a thickness of the base fabric 22*e* is 0.5 mm, a length of the fiber of the raised straight bristle 22*f* is about 4.5 mm.

As for the crimped bristle 22*g*, the material of the pile yarn, a fiber diameter, fiber density and the brush height thereof may be configured to be the same as the straight bristle 22*f*. What is different from the straight bristle 22*f* is that, after silk-reeling of the pile yarn, the pile yarn is made into the crimped textured bristle (false-twisted bristle), which has undergone a crimping process causing the bristle to shrink. Incidentally, the straight bristle 22*f* is fiber to which the crimping process is not applied after the silk-reeling. As for the crimped bristle 22*g*, the pile yarn after the crimping process is woven into the base fabric 22*e*, and after applying processes such as raising and shirring, the crimped bristle 22*g* is cut at a predetermined brush height. Therefore, an end surface of the charging brush 22 in the Z direction formed by the crimped bristles 22*g* and an end surface of the charging brush 22 in the Z direction formed by the straight bristles 22*f* are aligned in heights in the Z direction.

The crimping process for the pile yarn can be performed by any conventionally known method. For example, a method of straining and heat setting the bristle is common. The crimping of the crimped bristle 22*g* is preferable to be performed in degree of strength in which adjacent crimped bristles 22*g* are intertwined with each other in a state in which the crimped threads are woven into the base fabric 22*e*.

Figure 12:
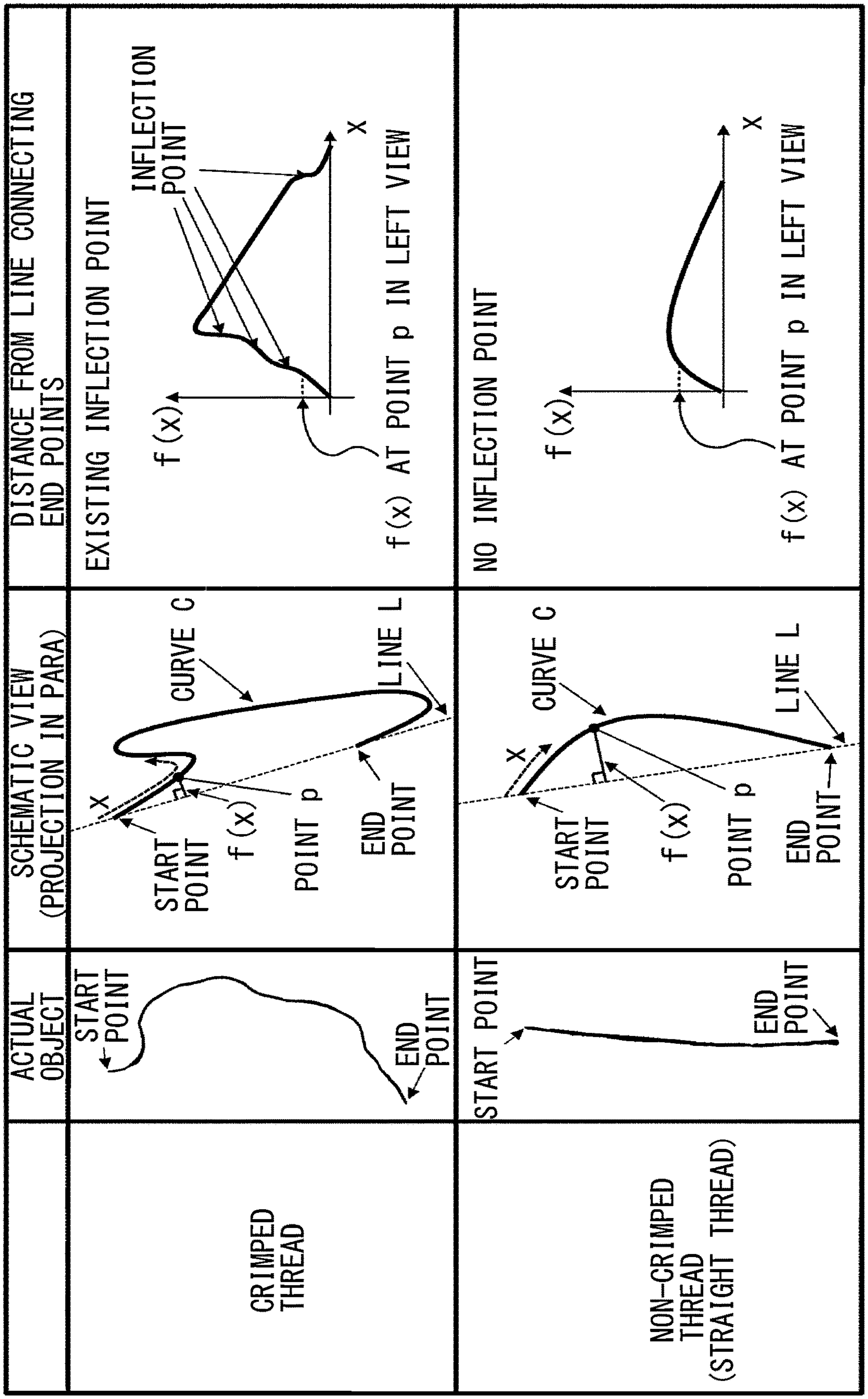
FIG. 12 is an explanatory view on an identification method of a crimped bristle.

When at first glance it is unclear whether the brush fiber of the charging brush 22 is the crimped bristle 22*g* or the straight bristle 22*f*, it may be determined as follows. As shown in FIG. 12, the brush fiber of the charging brush 22 are cut from the root and collected, and each brush fiber is placed on a horizontal plane and observed directly above (i.e., a vertically projected view, which is projected in parallel with a ray of light in the direction of gravity, is observed). A straight line connecting the root and a tip of the brush fiber is defined as a straight line L, and a curve along the brush fiber from the root to the tip is defined as a curve C. A length along the curve C from one endpoint on one side of the curve C (the root of the brush fiber) to any point p on the curve C is defined as a variable x, and a distance from the point p to the straight line L is defined as a function f(x) of x. If a graph of y=f(x) includes an inflection point, the brush fiber is determined to be the crimped bristle 22*g*, and otherwise the brush fiber is determined to be the straight bristle 22*f* (non-crimped thread). Incidentally, in FIG. 12, the brush fiber shown in a column of "actual fiber" and the brush fiber shown in a column of "schematic view (parallelly projected view)" to the right thereof are not the same fiber.

In the present Embodiment, the crimped bristles 22*g* are woven into a first region A1 of the base fabric 22*e* in the Y direction (widthwise direction). The straight bristles 22*f* are woven into a second region A2 of the base fabric 22*e* in the Y direction (widthwise direction). A width of the first region A1 is 2 mm and a width of the second region A2 is 3 mm. The second region A2 into which the straight bristles 22*f* are woven is provided in a downstream side of the first region A1 into which the crimped bristles 22*g* are woven in the rotational direction R of the photosensitive drum 21.

By the crimped bristles 22*g* woven into the first region A1 of the base fabric 22*e*, the crimped brush portion 22G as a first portion of the charging brush 22 is formed. By the straight bristles 22*f* woven into the second region A2 of the base fabric 22*e*, a straight brush portion 22F as a second portion of the charging brush 22, which is positioned downstream of the first portion in the moving direction of the surface of the photosensitive drum 21 in the contacting portion of the charging brush 22 and the photosensitive drum 21, is formed. The first portion of the charging brush 22 (crimped brush portion 22G) is an aggregate of the brush fiber supported by the first region A1 of the base fabric 22*e*. The second portion of the charging brush 22 (straight brush portion 22F) is an aggregate of the brush fiber supported by the second region A2 of the base fabric 22*e*.

In the charging brush 22 in the present Embodiment, the crimped brush portion 22G and the straight brush portion 22F are integrated as a single brush member, however, the crimped brush portion 22G and the straight brush portion 22F may be disposed separately as in an Embodiment 2 and an Embodiment 3, which will be described below. The charging brush 22 may be a brush unit which includes two or more of mutually independent brushes. In other words, the crimped brush portion 22G (the first portion of the charging brush 22) may be a first brush, and the straight brush portion 22F (the second portion of the charging brush 22) may be a second brush, which is disposed apart from the crimped brush portion 22G in a downstream side in the rotational direction R of the photosensitive drum 21.

Ratio of the crimped bristle 22*g* (first type of fiber) in the brush fiber in the first portion of the charging brush 22 is at least higher than ratio of the crimped bristle 22*g* in the brush fiber in the second portion of the charging brush 22. The "ratio" here is ratio of a number of crimped bristles 22*g* constituting the first portion or the second portion to a number of the brush fiber (sum of a number of the crimped bristles 22*g* and a number of the straight bristles 22*f*) constituting the first portion or the second portion. By this, it becomes possible to realize both of uniformity of charging and suppression of charging defect caused by the foreign matter, as described below. In the present Embodiment, the ratio of the crimped bristle 22*g* in the brush fiber in the first portion (crimped brush portion 22G) of the charging brush 22 is 100%, and the ratio of the crimped bristle 22*g* in the brush fiber in the second portion (straight brush portion 22F) of the charging brush 22 is 0%.

In the present Embodiment, the first region A1 and the second region A2 are disposed with a space of 0.3 mm in the Y direction (widthwise direction). This space is set so that the crimped brush portion 22G, which is constituted by the crimped bristles 22*g* woven into the first region A1, and the straight brush portion 22F, which is constituted by the straight bristles 22*f* woven into the second region A2, are in contact with each other. In other words, a downstream end of the crimped brush portion 22G and an upstream end of the straight brush portion 22F are in contact with each other in the rotational direction R of the photosensitive drum 21. The space between the first region A1 and the second region A2 may be 0.3 mm or less. In addition, when degree of crimping of the crimped bristle 22*g* is strong, even if the space between the first region A1 and the second region A2 is more than 0.3 mm, the crimped brush portion 22G and the straight brush portion 22F may be brought into contact with each other.

By configuring the crimped brush portion 22G and the straight brush portion 22F to be in contact with each other, as described below, the straight brush portion 22F can support the crimped brush portion 22G from the downstream side in the rotational direction R of the photosensitive drum 21 and can suppress falling of bristles of the crimped bristle 22*g*. To suppress the falling of bristles of the crimped bristle 22*g* by the crimped brush portion 22G and the straight brush portion 22F being in contact with each other, the space between the first region A1 and the second region A2 is preferably 2 mm or less.

Incidentally, in the present Embodiment, the configuration in which the two types of the pile yarn (22*f*, 22*g*) are woven into the common base fabric 22*e* is described, however, the two types of the pile yarn (22*f*, 22*g*) may be woven into separate base fabrics and the two base fabrics may be attached to the common base sheet metal 22*d*.

The straight bristle 22*f* and the crimped bristle 22*g* are, together with the base fabric 22*e*, in conduction with the base sheet metal 22*d* via an unshown conductive paste. The base sheet metal 22*d* is electrically connected to the brush power source E4, and is configured to be capable of applying the voltage from the brush power source E4. In other words, the straight bristle 22*f* and the crimped bristle 22*g* are provided so as to be controllable of the voltage by the brush power source E4. In other words, the control portion 150 can control the voltage applied to the brush fiber of the charging brush 22.

A resistance value of the charging brush 22 is measured by pressing the stainless steel sheet metal from vertically above the charging brush 22 (Z direction) so as a penetrating amount to be 1 mm and applying voltage between the base sheet metal 22*d* and the stainless steel sheet metal. The penetrating amount here is a difference between a bristle height of the brush fiber before the stainless steel sheet metal is pressed and the bristle height of the brush fiber in a state in which the stainless steel sheet metal is pressed. The applied voltage is +250 V, and the resistance value at a time when five seconds lapse after the voltage is applied is defined as a brush resistance. ST5520 manufactured by HIOKI E.E. CORPORATION is used for the resistance measurement.

In the present Embodiment, the brush resistance is in a range of $1.0\times10^{4}\Omega$ to $1.0\times10^{6}\Omega$. The brush resistance can be controlled to a desired value by varying the material of the conductive particles dispersed in the conductive pile yarn and the content of conductive particles relative to the resin material of the pile yarn.

If the brush resistance is too large, it becomes difficult for current to flow through the brush fiber, and the surface of the photosensitive drum 21 may not be charged properly. In addition, if the brush resistance is too small, large current may flow locally from the charging brush 22 to the photosensitive drum 21, and it becomes likely for a phenomenon, in which a photosensitive layer of the photosensitive drum 21 experiences an insulation breakdown (so-called pinhole leakage), to occur. In light of the above, the brush resistance is preferably set in a range of $1.0\times10^{2}\Omega$ to $1.0\times10^{8}\Omega$, more preferably in the range of $1.0\times10^{4}\Omega$ to $1.0\times10^{6}\Omega$.

The brush fiber (22*f*, 22*g*) of the charging brush 22 are in contact with the photosensitive drum 21 at the predetermined contact pressure by the elasticity of the brush holding sheet 22*a*, which is a flexible sheet member. In the present Embodiment, a length in the longitudinal direction of the charging brush 22 is 235 mm, and a length in the widthwise direction is about 5 mm. The charging brush 22 is in contact with the photosensitive drum 21 at a total pressure of 60 gf.

If the contact pressure of the brush is set too high, scratches, etc. to the photosensitive drum 21 by the charging brush 22 may occur.

In addition, in the present Embodiment, the cleaner-less configuration, in which no cleaning member is provided for the removal of the transfer residual toner, is employed. In the cleaner-less configuration, if the contact pressure between the charging brush 22 and the photosensitive drum 21 is high, then the transfer residual toner may be blocked by the charging brush 22, causing contamination of the brush and deterioration in the charging performance.

In addition, if the contact pressure of the charging brush 22 is too low, the charging brush 22 may not be in contact with the surface of the photosensitive drum 21 with the uniform contact pressure, or the brush may be tilted or be moved by the rotation of the photosensitive drum 21.

In light of the above, the contact pressure (total pressure, total load) of the charging brush 22 against the photosensitive drum 21 is preferably in a range of 40 gf to 200 gf.

Incidentally, instead of the configuration in which the charging brush 22 is in contact with the photosensitive drum 21 by the elasticity of the brush holding sheet 22*a*, both ends in the longitudinal direction of the supporting member of the charging brush 22 may be urged by an urging means such as a spring or rubber. In other words, it may be a configuration in which the brush fiber of the charging brush 22 is in contact with the surface of the photosensitive drum 21 by urging force of the urging means which urges the supporting member.

In addition, it may be a configuration in which the supporting member of the charging brush 22 is fixed to the frame member 22*b* and the charging brush 22 is brought into contact with the photosensitive drum 21 with a predetermined penetrating amount. In other words, the image forming apparatus 1 may be provided with a supporting member which supports the charging brush 22 and is fixed in a position relative to the rotational axis of the photosensitive drum 21. In this case, a distance between the supporting member and the surface of the photosensitive drum 21 is set to be shorter than a dimension of the charging brush 22 in a bristle height direction (the Z direction) of the brush fiber in a state before the charging brush 22 is mounted on the supporting member. By this, the brush fiber of the charging brush 22 is in contact with the photosensitive drum 21 with a predetermined penetrating amount.

The charging brush 22 is preferably be disposed so that a center portion of the charging brush 22 in the Y direction (widthwise direction) is positioned between 30° and 150° in the rotational direction R of the photosensitive drum 21 (clockwise in FIG. 1) with reference to a downward of the photosensitive drum 21 in the direction of gravity (downward in FIG. 1) as 0°. In the present Embodiment, the charging brush 22 is disposed in a position where an angle θ (FIG. 1) is 100°. In addition, as shown in FIG. 1, the charging brush 22 is disposed so that a vertical line 22*h*, which passes through the center portion of the charging brush 22 in the Y direction (widthwise direction) and is perpendicular to the base fabric 22*e*, passes through a rotational axis A21 of the photosensitive drum 21. In other words, as viewed in the rotational axis direction A21 of the photosensitive drum 21, a center position of the contacting portion of the charging brush 22 and the photosensitive drum 21 in the rotational direction R of the photosensitive drum 21 is preferably disposed within a range of 30° to 150°, which is the angle θ measured in the rotational direction R of the photosensitive drum 21 with a half line drawn in the direction of gravity from the rotational axis as a reference.

Incidentally, the charging brush 22 may be disposed so that the base fabric 22*e* is tilted to the surface of the photosensitive drum 21. In other words, as viewed in the rotational axis direction A21 of the photosensitive drum 21, the arrangement may be such that the widthwise direction (Y direction) of the charging brush 22 is crossing obliquely a tangential line direction of the photosensitive drum 21 in the contacting portion of the charging brush 22 and the photosensitive drum 21. A direction of the tilt may be a direction in which the base fabric 22*e* approaches to the surface of the photosensitive drum 21 as it goes upstream side in the rotational direction R of the photosensitive drum 21.

The charging brush 22 charges the surface of the photosensitive drum 21 (surface of photosensitive drum 21 after the transfer process) which has passed through the transfer portion. On the surface of the photosensitive drum after the transfer process, there is relatively large unevenness in potential (unevenness in the drum surface potential) due to the electric discharge of the transfer roller 12. Incidentally, in the present Embodiment, to the transfer roller 12, the transfer voltage of +1000 V is applied.

Of the surface of the photosensitive drum 21, an area where the toner image is formed before the transfer process (exposed portion before the developing process) is defined as a printing portion, and an area where the toner image is not formed before the transfer process (non-exposed portion before the developing process) is defined as a non-printing portion. The drum surface potential of the non-printing portion before the transfer process is the dark portion potential Vd (−500 V in the present Embodiment), and the drum surface potential of the printing portion is the light portion potential Vl (−50 V in the present Embodiment). Through the transfer process, the drum surface potential of the non-printing portion changes from −500 V to −250 V, and the drum surface potential of the printing portion changes from −50 V to +50 V.

Incidentally, the above drum surface potential after the transfer process is only an average value, and there are some portions where the potential deviates significantly from the average value locally.

The charging brush 22 charges the surface of the photosensitive drum 21 after the transfer process and also makes the drum surface potential uniformed (reduces unevenness of the potential) after the transfer process. In the present Embodiment, the charging voltage of −500 V is applied to the charging brush 22. In the present Embodiment, after charging by the charging brush 22, the drum surface potential is further raised to the dark portion potential Vd uniformly by the electric discharge of the charging roller 23. In the present Embodiment, the charging voltage of −1000 Vis applied to the charging roller 23.

In addition, in the cleaner-less configuration employed in the present Embodiment, at least a portion of the transfer residual toner reaches the contacting portion of the charging brush 22 and the photosensitive drum 21 and the contacting portion of the charging roller 23 and the photosensitive drum 21.

In the transfer residual toner, not only the toner with the negative polarity, which is the original polarity of the toner, but also the toner charged with the positive polarity, which is the reverse polarity due to the transfer process, and the toner with almost no electric charge are included.

Since high voltage is applied to the charging brush 22 on the negative polarity side than to the photosensitive drum 21, these kinds of transfer residual toner are recharged to the negative polarity by the charging brush 22 upon passing through the contacting portion of the charging brush 22 and the photosensitive drum 21. Since high voltage is also applied to the charging roller 23 on the negative polarity side than to the photosensitive drum 21, the transfer residual toner which is negatively charged reaches the contacting portion of the developing portion with the rotation of the photosensitive drum 21 without adhering to the charging roller 23, and is collected into the developer container 32.

The charging roller 23 is in contact with the photosensitive drum 21 at predetermined pressing force. In the present Embodiment, the charging roller 23 is in contact with the photosensitive drum 21 with a load of 500 gf.

The charging roller 23 in the present Embodiment has a multi-layered structure with a core metal having a diameter of 6 mm made of stainless steel as a supporting member, surrounded by a plurality of flexible resin layers. In the present Embodiment, the plurality of resin layers have a two-layer structure including a base layer, which is a first resin layer covering the core metal, and a surface layer, which is a second resin layer covering the base layer. Resin material of the base layer is conductive hydrin rubber with conductive carbon dispersed therein. The base layer of the conductive hydrin rubber is formed by extrusion molding on the core metal and a thickness thereof is about 2 mm. In the present Embodiment, the conductive hydrin rubber is employed as the base layer, however, it is not limited thereto as long as the resin material has flexibility and conductivity.

Figure 5:
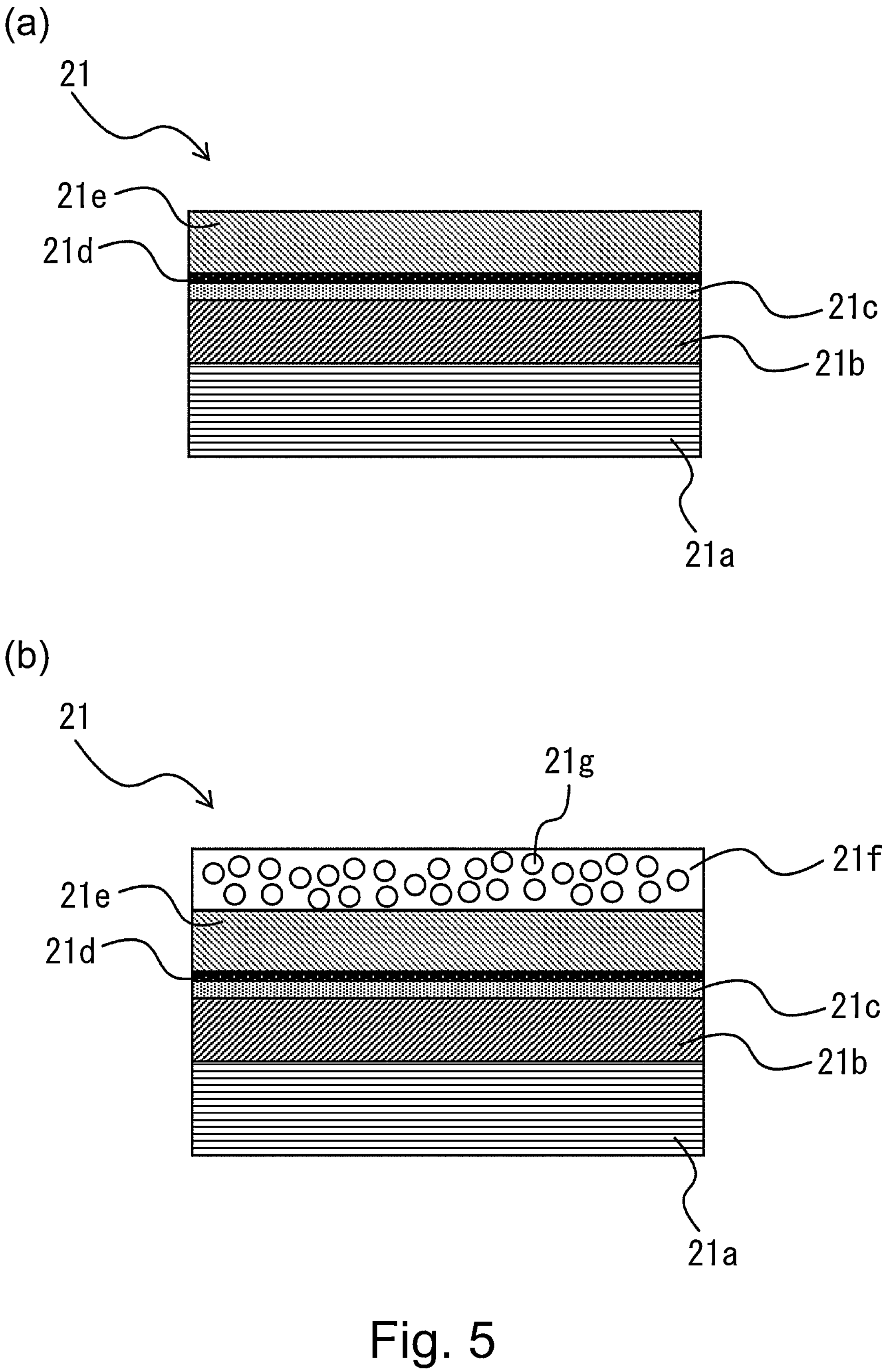
FIG. 5, part (a) and part (b), is a view illustrating a layer configuration of a photosensitive drum according to the Embodiments.

The photosensitive drum 21 according to the present Embodiment includes, as shown in part (a) of FIG. 5, a conductive supporting member 21*a* made of an aluminum cylinder, a conductive layer 21*b*, an undercoat layer 21*c* and a photosensitive layer constituted by two layers of an electrical charge generating layer 21*d* and an electrical charge transporting layer 21*e*.

In order to suppress the scratches of the surface of photosensitive drum 21 and to adjust coefficient of friction, a photosensitive drum 21 with one more layer (surface layer, releasing layer) applied on top of the electrical charge transporting layer 21*e* may be used.

In addition, as shown in part (b) of FIG. 5, an electrical charge injecting layer 21*f* may be provided on top of the electrical charge transporting layer 21*e* to lower resistance value of the surface of the photosensitive drum 21 to a predetermined value.

Since it is easy for the charging brush 22 to have a large contact area with the photosensitive drum 21 and the charging brush 22 is excellent in electrical charge injecting performance, charging performance can be further improved by combining the photosensitive drum 21 provided with the electrical charge injecting layer 21*f*.

By making the electrical charge injecting layer 21*f* contain an appropriate amount of conductive particles 21*g*, as also disclosed in Japanese Patent Application Laid-Open No. 2023-56470, a resistance value thereof can be adjusted. From a viewpoint of maintaining performance for the electrostatic latent image and the charging performance of the electrical charge injecting layer 21*f*, a volume resistance value of the electrical charge injecting layer 21*f* is preferably $1.0\times10^{11}$ Ωcm or more and $1.0\times10^{14}$ Ωcm or less.

As described above, in the present Embodiment, the configuration in which a two-stage charging process, in which the photosensitive drum 21 is auxiliarily charged by the charging brush 22 and then recharged by the charging roller 23 is performed, is described. However, it may be configured that the surface of the photosensitive drum 21 is uniformly charged to desired drum surface potential (enough potential to make an appropriate toner image through the exposure process and the developing process) only by the charging with the charging brush 22.

(6. Inhibition of the Charging by the Foreign Matter)

There is a case in which, when the foreign matter such as paper dust passes through the contacting portion of the charging brush 22 and the photosensitive drum 21 and the contacting portion of the charging roller 23 and the photosensitive drum 21, the foreign matter may inhibit the charging of the surface of the photosensitive drum 21 by the charging brush 22 and the charging roller 23, causing local charging defect to occur. In particular, in a case in which a size of the foreign matter is relatively large, image defect caused by the charging defect due to the foreign matter may become apparent in the image formed on the recording material P in the subsequent image forming process (referred to as a printed image).

Hereinafter, it will be described that while the image defect caused by the foreign matter may occur even in an image forming apparatus provided with a cleaning member which collects the transfer residual toner, why it becomes more notable in the cleaner-less configuration as in the present Embodiment.

First, in the cleaner-less configuration, the transfer residual toner is conveyed to the developing portion. When the transfer residual toner passes through the contacting portion between the charging brush 22 and the photosensitive drum 21 and the contacting portion of the charging roller 23 and the photosensitive drum 21, the transfer residual toner itself may inhibit the charging of the photosensitive drum 21 by the charging brush 22 and the charging roller 23, causing the local charging defect to occur. However, since a particle diameter of the transfer residual toner is small (7 μm in the present Embodiment), a possibility that the image defect of a visible size occurs in the printed image on the recording material P is low, and there is no problem in practical.

Through examination conducted by the present inventor, in the present Embodiment, it is found that if a size of an area where the charging defect occurs on the surface of photosensitive drum 21 is approximately 0.3 mm or less in diameter, image defect which is easily visible to a general user does not occur in the printed image on the recording material P. Incidentally, in order to reduce a possibility of the image defect with the degree of being visible to the general user to become apparent, the area in which the charging defect occurs is preferably 0.1 mm or less in diameter. Therefore, in the present Embodiment, there is no problem in practical with the transfer residual toner passing through the charging brush 22.

However, in the cleaner-less configuration, in addition to the transfer residual toner, the foreign matter from outside the image forming apparatus 1 may enter the contacting portion of the charging brush 22 and the photosensitive drum 21 and the contacting portion of the charging roller 23 and the photosensitive drum 21. Examples of the foreign matter include the paper dust which is generated from a paper used as the recording material P, and dust and/or dust particles which are contained in an air sucked from outside to inside of the image forming apparatus 1. There may be a case that the foreign matter conveyed with the recording material P adheres to the photosensitive drum 21 in the transfer portion, or the foreign matter drift in the air adheres to the photosensitive drum 21.

The foreign matter may include objects from 0.1 mm to several mm in size. Hereinafter, the foreign matter with a major axis diameter of 0.1 mm or more is referred to as "foreign matter with a large size". If the foreign matter with a large size passes through the contacting portion of the charging brush 22 and the photosensitive drum 21 and the contacting portion of the charging roller 23 and the photosensitive drum 21 in a state of being adhered onto the photosensitive drum 21, the charging defect occurs on the surface of the photosensitive drum 21 in an area corresponding to the size of the foreign matter. In other words, the area in which the charging defect occurs due to the foreign matter with a large size may be 0.1 mm or more in diameter.

If the charging defect occurs in an area with a size of approximately 0.1 mm or more in diameter, in the printed image on the recording material P formed in the subsequent image forming process, the image defect at a level visible to the general user may occur. Examples of the image defect include a black dot image in an area originally printed in white (solid white portion) and roughening of a halftone image.

Here, the charging brush 22 in the present Embodiment includes the crimped brush portion 22G formed with the crimped bristles 22*g* in the first region A1, which is a region in the upstream side in the rotational direction R of the photosensitive drum 21 (FIG. 3). The charging brush 22 can collect the foreign matter such as the paper dust adhering to the photosensitive drum 21 by entangling the foreign matter with the crimped bristle 22*g*.

That is, apparent density of the brush fiber in the crimped brush portion 22G becomes larger since the crimped bristle 22*g* is the brush fiber crimped through the crimping process. For the crimped bristle 22*g* used in the present Embodiment, to produce the same brush height, the pile yarn which is approximately twice long compared to the straight bristle 22*f* woven in the same number density is used. In other words, by the pile yarn being crimped through the crimping process, the brush fiber in the crimped brush portion 22G has a space density approximately twice as large as that of the straight brush portion 22F. The space density is ratio of volume occupied by the brush fiber relative to a rectangular space defined by the lengths of the charging brush 22 in the longitudinal direction and in the widthwise direction and the bristle height of the brush fiber with respect to the base fabric 22*e*.

In addition, the crimping in the crimping process has no regularity and the crimped bristles 22*g* are raised in random directions. Therefore, the crimped bristles 22*g* are intertwined with each other at a high density.

Therefore, the foreign matter with a large size which arrives the contacting portion of the charging brush 22 and the photosensitive drum 21 cannot pass through the crimped bristles 22*g* (crimped brush portion 22G), which are intertwined in the high density, and is entangled by the crimped bristles 22*g* (crimped brush portion 22G). As a result, it becomes possible to suppress the foreign matter with a large size from entering the contacting portion of the straight brush portion 22F, which is in the downstream side of the crimped brush portion 22G, and the photosensitive drum 21.

When the foreign matter with a large size entangled in the crimped brush portion 22G reaches a certain degree of lump, the foreign matter collapses and falls in the direction of gravity due to vibration of the image forming apparatus 1 during the image formation, vibration of the image forming apparatus 1 when the feeding cassette is mounted, etc., and is accommodated in the closed space mentioned above. In the present Embodiment, the foreign matter which falls from the charging brush 22 is collected in the closed space throughout the service life of the process cartridge 20.

In the present Embodiment, the fiber diameter of the crimped bristle 22*g* is 15 μm. Therefore, the foreign matter and the transfer residual toner smaller than 15 μm in size pass through the charging brush 22 without being entangled in the contacting portion of the crimped brush portion 22G and the photosensitive drum 21. However, as mentioned above, even if the charging defect occurs due to the foreign matter or the transfer residual toner of this size, there is no problem in practical since it is unlikely for the image defect at the level visible to the general user to occur in the printed image on the recording material P. Incidentally, the foreign matter and the transfer residual toner with a size of 15 μm or less can pass through the contacting portion of the charging brush 22 and the photosensitive drum 21 without being scraped off with the contact pressure of the charging brush 22 in the present Embodiment since electrostatic adhesion and non-electrostatic adhesion thereof to the photosensitive drum 21 are strong.

By the way, since the crimped bristle 22*g* is brush fiber to which the crimping process making irregular crimp is applied, the brush fiber has less firmness (bending rigidity is low) and tends to fall easily compared to the straight brush fiber 22*f*, which is raised perpendicularly to the base fabric 22*e*. Therefore, the crimped bristle 22*g* is more likely to fall in the downstream side of the rotational direction R of the photosensitive drum 21 than the straight bristle 22*f* by being dragged by the surface of the rotating photosensitive drum 21 or being pushed by the foreign matter conveyed by the photosensitive drum 21. Hereinafter, the falling of the brush fiber to the downstream side of the rotational direction R of the photosensitive drum 21 will be referred to as the falling of bristles. If the falling of bristles of the crimped bristle 22*g* occurs, the foreign matter once entangled in the crimped bristles 22*g* may be ejected onto the photosensitive drum 21, or the crimped bristles 22*g* may not be able to entangle the foreign matter which newly enters the charging brush 22.

In the present Embodiment, the crimped brush portion 22G and the straight brush portion 22F are disposed so that the straight brush portion 22F formed by the straight bristles 22*f* is in contact with the crimped brush portion 22G formed by the crimped bristles 22*g* from downstream side of the rotational direction R of the photosensitive drum 21. The straight bristles 22*f* are raised perpendicularly to the base fabric 22*e* and have more firmness (bending rigidity is high) compared to the crimped bristles 22*g*, to which the crimping process is applied.

Thus, by the straight bristles 22*f* of the straight brush portion 22F supporting the crimped bristles 22*g* of the crimped brush portion 22G, it becomes possible to suppress the falling of bristles of the crimped bristle 22*g*.

By the way, as shown in FIG. 3, since the crimped bristles 22*g* are irregularly crimped through the crimping process, tip positions (bristle heights) of the brush fiber in the Z direction tends to be uneven. Therefore, it is difficult to bring the tips of each crimped bristle 22*g* of the crimped brush portion 22G into contact with the surface of the photosensitive drum 21 at uniform contact pressure. For the charging by the charging brush 22, to obtain good charging performance, it is preferable that the charging brush 22 be in contact with the photosensitive drum 21 uniformly at as little pressure as possible. However, in a case in which the tips of the brush fiber are not in contact with the surface of the photosensitive drum 21 at uniform contact pressure, it is difficult to uniformly charge the surface of the photosensitive drum 21 via the brush fiber.

In a case in which the surface of photosensitive drum 21 is not uniformly charged by the charging brush 22, there is a possibility that unevenness remains also in the drum surface potential after the charging by the charging roller 23. Specifically, in a case in which the brush fiber is partially in no contact with the surface of the photosensitive drum 21 due to a position of the charging brush 22 in the longitudinal direction, unevenness of potential having a streak shape, which extends in a sub scanning direction of the photosensitive drum 21, may occur. In a case in which the unevenness of potential after the charging by the charging brush 22 is significant, the unevenness of potential will remain after the charging by the charging roller 23, and the unevenness of the charging by the charging brush 22 may become apparent as unevenness of density having a streak shape in the printed image.

In contrast, for the straight bristles 22*f*, to which the crimping process is not applied, the tip positions (bristle heights) of the brush fiber in the Z direction can be easily regulated. Therefore, it is possible to bring the tips of each straight bristle 22*f* into contact with the surface of the photosensitive drum 21 at uniform contact pressure. Thus, in a case in which the tips of the brush fiber are in contact with the surface of the photosensitive drum 21 at uniform contact pressure, the surface of the photosensitive drum 21 can be uniformly charged via the brush fiber.

As described above, in the present Embodiment, the crimped brush portion 22G formed by the crimped bristles 22*g* is disposed in the upstream side in the rotational direction R of the photosensitive drum 21, and the straight brush portion 22F formed by the straight bristles 22F is disposed in the downstream side in the rotational direction R of the photosensitive drum 21.

By this, it becomes possible for the crimped brush portion 22G in the upstream side to entangle the foreign matter with a large size and to suppress the foreign matter with a large size from entering the contacting portion of the straight brush portion 22F and the photosensitive drum 21 in the downstream side. Therefore, it becomes possible to reduce the occurrence of the image defect caused by the foreign matter with a large size.

In addition, by charging the surface of the photosensitive drum 21 with the straight brush portion 22F having regulated bristle heights, the surface of the photosensitive drum 21 can be charged more uniformly.

Furthermore, in the present Embodiment, the crimped brush portion 22G in the upstream side is disposed so as to be in contact with the straight brush portion 22F in the downstream side. By this, it becomes possible for the straight bristles 22*f* of the straight brush portion 22F to support the crimped bristles 22*g* of the crimped brush portion 22G and to suppress the crimped bristles 22*g* from falling in the downstream side of the rotational direction R of the photosensitive drum 21. In other words, it becomes possible to maintain the functions of the crimped brush portion 22G and the straight brush portion 22F for a longer period of time. In addition, as described in an Embodiment 3 below, compared to a case in which the widthwise direction of the crimped brush portion 22G is made wider to reduce the effects of the falling of bristles, a space required for disposing the charging brush 22 becomes smaller, therefore it is advantageous for downsizing of the image forming apparatus 1.

The falling of bristles of the crimped bristle 22*g* may also occur during assembly of the charging brush 22 to the process cartridge 20. In the present Embodiment, since the crimped brush portion 22G in the upstream side and the straight brush portion 22F in the downstream side are disposed so as to be in contact with each other, it also becomes possible to suppress the falling of bristles of the crimped bristle 22*g* during assembly.

In addition, both the crimped brush portion 22G and the straight brush portion 22F are configured to permit the transfer residual toner to pass through. Specifically, the density, the contact pressure with the photosensitive drum 21, the fiber diameters, etc. of the crimped bristles 22*g* and the straight bristles 22*f* in the crimped brush portion 22G and in the straight brush portion 22F, respectively, are set so as to permit the transfer residual toner to pass through. Therefore, the transfer residual toner can be efficiently collected in the developing portion.

(7. Charging Performance in the Embodiments and Comparative Examples)

Results of experiments comparing the charging performance etc. of the charging brush 22 according to the Embodiments and the charging brush 22 according to Comparative Examples will be described.

Figure 6:
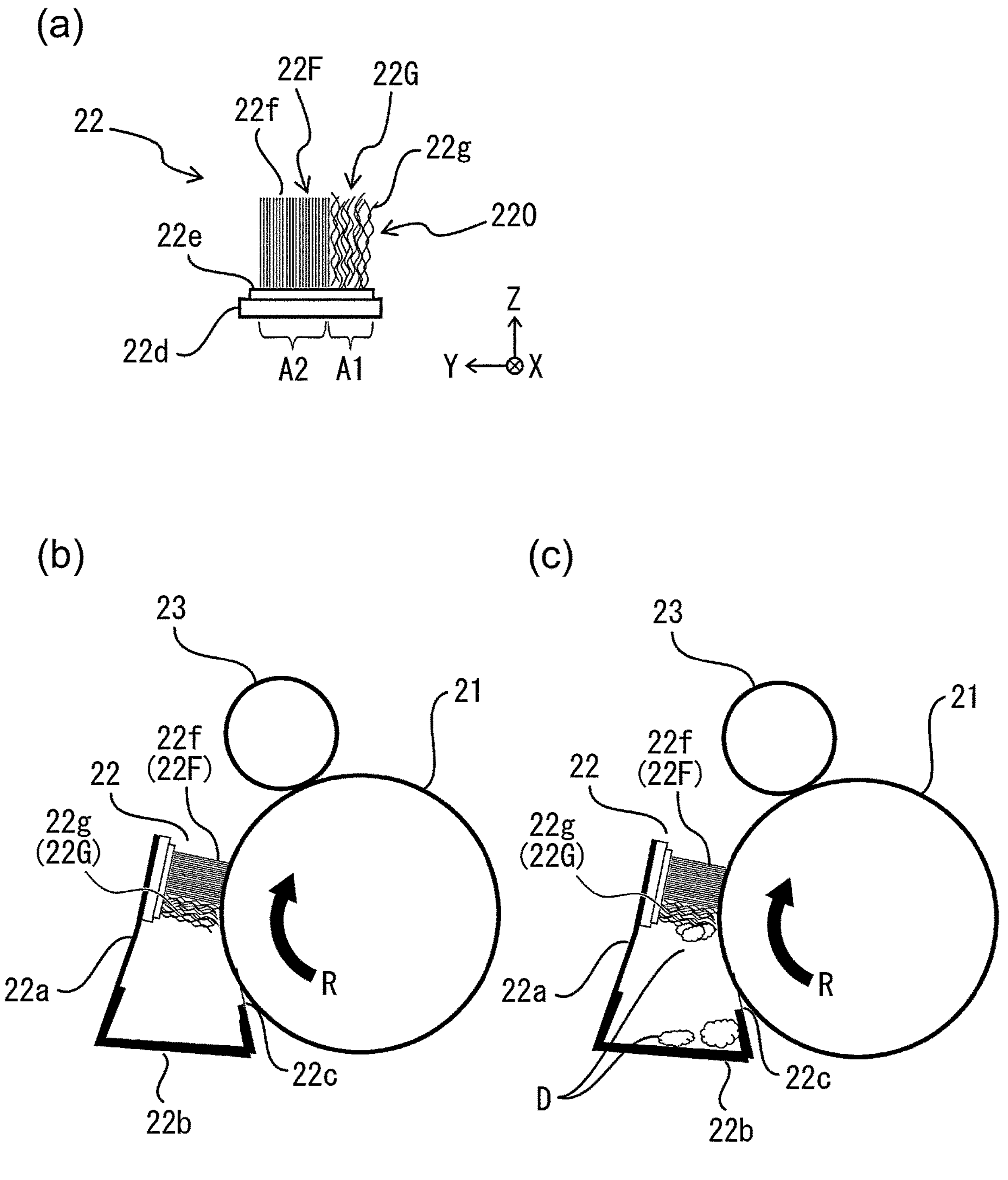
FIG. 6, part (a), part (b) and part (c), is an explanatory view of a charging brush according to an Embodiment 1.

Part (a), part (b) and part (c) of FIG. 6 are explanatory views of the charging brush 22 in the Embodiment 1. Part (a) of FIG. 6 is a cross-sectional view illustrating a cross-section of the charging brush 22 along the Y direction (widthwise direction). Part (b) of FIG. 6 is a schematic view illustrating a state in which the charging brush unit is assembled to the photosensitive drum 21. Part (c) of FIG. 6 is a schematic view illustrating the charging brush unit after the paper passing operation.

Figure 7:
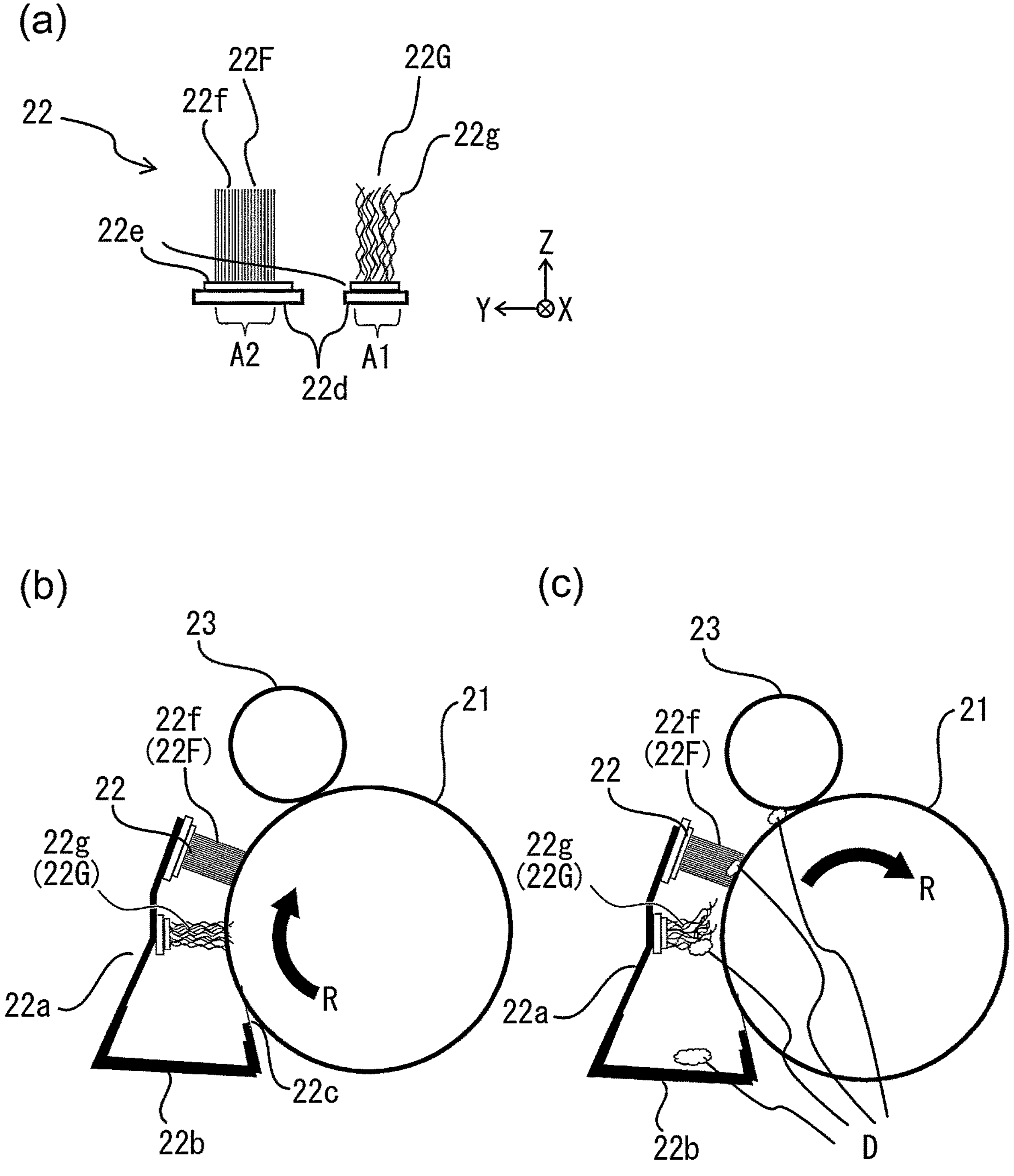
FIG. 7, part (a), part (b) and part (c), is an explanatory view of a charging brush according to an Embodiment 2.

Part (a), part (b) and part (c) of FIG. 7 are explanatory views of a charging brush 22 in an Embodiment 2. Part (a) of FIG. 7 is a cross-sectional view illustrating a cross-section of the charging brush 22 along the Y direction (widthwise direction). Part (b) of FIG. 7 is a schematic view illustrating a state in which a charging brush unit is assembled to the photosensitive drum 21. Part (c) of FIG. 7 is a schematic view illustrating the charging brush unit after the paper passing operation.

As shown in part (a) and part (b) of FIG. 7, in the charging brush 22 in the Embodiment 2, of the base fabric 22*e*, a first region A1 into which the crimped bristles 22*g* are woven and a second region A2 into which the straight bristles 22*f* are woven are separated, and a crimped brush portion 22G and a straight brush portion 22F are not in contact with each other. Other configurations of the charging brush 22 in the Embodiment 2 are the same as those of the charging brush 22 in the Embodiment 1.

Figure 8:
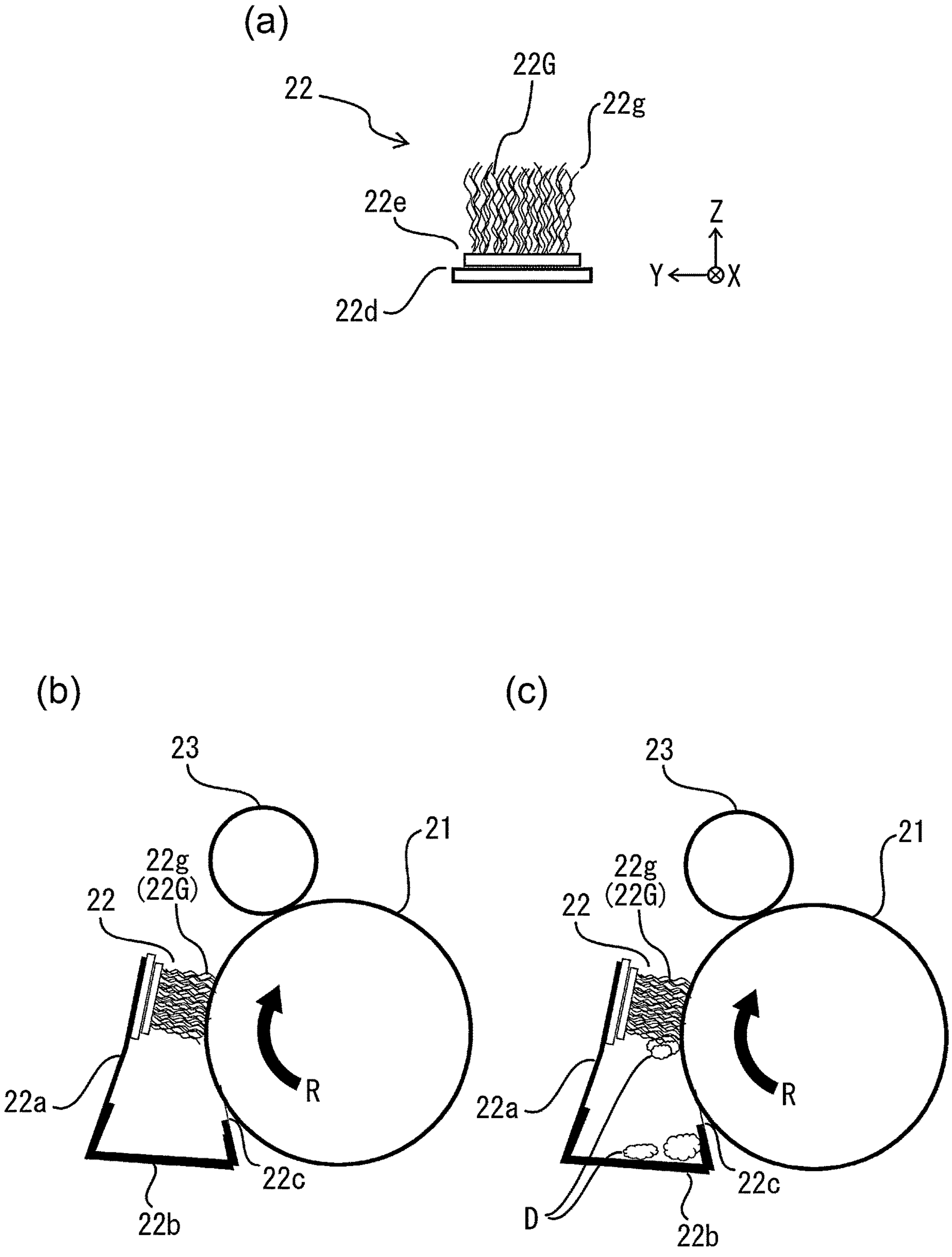
FIG. 8, part (a), part (b) and part (c), is an explanatory view of a charging brush according to a Comparative Example 1.

Part (a), part (b) and part (c) of FIG. 8 are explanatory views of a charging brush 22 in a Comparative Example 1. Part (a) of FIG. 8 is a cross-sectional view illustrating a cross-section of the charging brush 22 along the Y direction (widthwise direction). Part (b) of FIG. 8 is a schematic view illustrating a state in which a charging brush unit is assembled to the photosensitive drum 21. Part (c) of FIG. 8 is a schematic view illustrating the charging brush unit after the paper passing operation.

As shown in part (a) and part (b) of FIG. 8, the charging brush 22 in the Comparative Example 1 includes only the crimped bristles 22*g* as the brush fiber and does not include the straight bristles 22*f*. Other configurations of the charging brush 22 in the Comparative Example 1 are the same as those of the charging brush 22 in the Embodiment 1.

Figure 9:
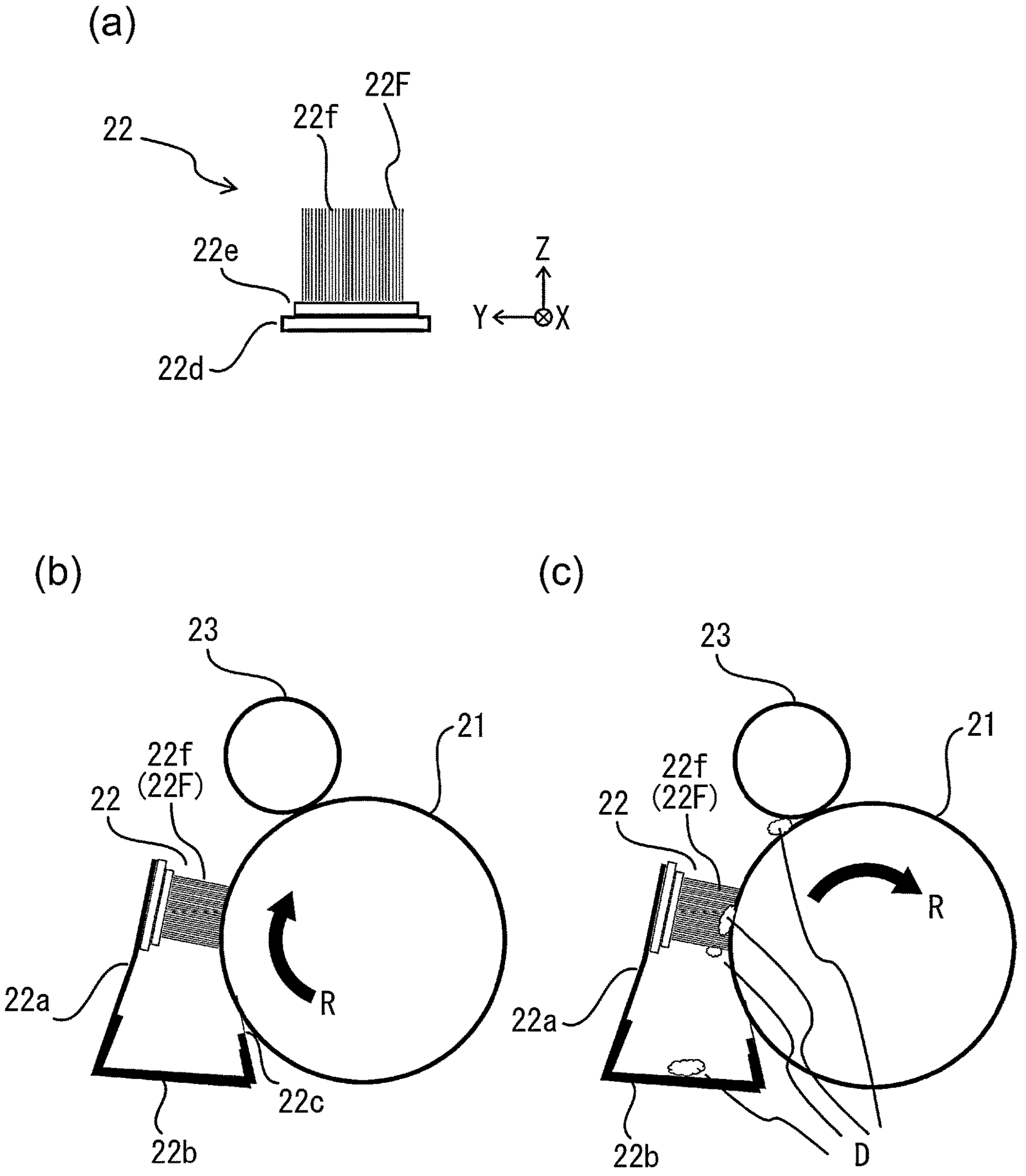
FIG. 9, part (a), part (b) and part (c), is an explanatory view of a charging brush according to a Comparative Example 2.

Part (a), part (b) and part (c) of FIG. 9 are explanatory views of a charging brush 22 in a Comparative Example 2. Part (a) of FIG. 9 is a cross-sectional view illustrating a cross-section of the charging brush 22 along the Y direction (widthwise direction). Part (b) of FIG. 9 is a schematic view illustrating a state in which a charging brush unit is assembled to the photosensitive drum 21. Part (c) of FIG. 9 is a schematic view illustrating the charging brush unit after the paper passing operation.

As shown in part (a) and part (b) of FIG. 9, the charging brush 22 in the Comparative Example 2 includes only the straight bristles 22*f* as the brush fiber and does not include the crimped bristles 22*g*. Other configurations of the charging brush 22 in the Comparative Example 2 are the same as those of the charging brush 22 in the Embodiment 1.

Figure 10:
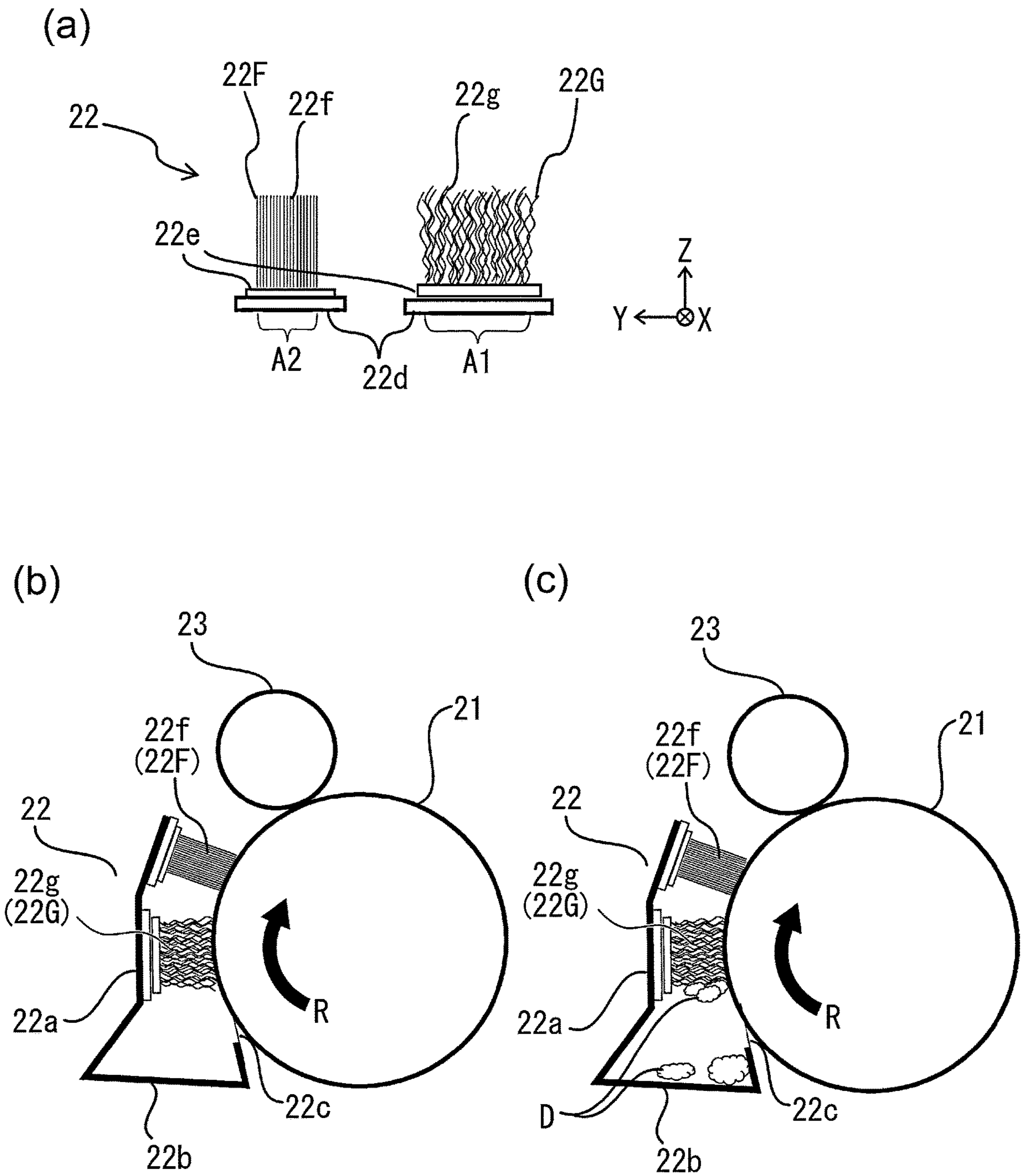
FIG. 10, part (a), part (b) and part (c), is an explanatory view of a charging brush according to an Embodiment 3.

Part (a), part (b) and part (c) of FIG. 10 are explanatory views of a charging brush 22 in an Embodiment 3. Part (a) of FIG. 10 is a cross-sectional view illustrating a cross-section of the charging brush 22 along the Y direction (widthwise direction). Part (b) of FIG. 10 is a schematic view illustrating a state in which a charging brush unit is assembled to the photosensitive drum 21. Part (c) of FIG. 10 is a schematic view illustrating the charging brush unit after the paper passing operation.

As shown in part (a) and part (b) of FIG. 10, the charging brush 22 in the Embodiment 3 has a configuration in which a width in the Y direction (widthwise direction) of the crimped brush portion 22G are elongated compared to the Embodiment 2. In other words, in the charging brush 22 in the Embodiment 3, of the base fabric 22*e*, a first region A1 into which the crimped bristles 22*g* are woven and a second region A2 into which the straight bristles 22*f* are woven are separated, and a crimped brush portion 22G and a straight brush portion 22F are not in contact with each other. Other configurations of the charging brush 22 in the Embodiment 3 are the same as those of the charging brush 22 in the Embodiment 1.

The width in the Y direction (widthwise direction) of the crimped brush portion 22G is 5 mm, for example, and the width in the Y direction (widthwise direction) of the straight brush portion 22F is 3 mm, for example. In the Embodiment 3, the width of the crimped brush portion 22G is wider than that of the straight brush portion 22F. In addition, the width in the Y direction (widthwise direction) of the crimped brush portion 22G is preferably 5 mm or more in order to more reliably suppress the falling of bristles of the crimped brush portion 22G.

<<Evaluation Method and Results>>

Results on initial charging performance, performance to suppress the effect from the foreign matter in the charging, and space-saving performance evaluated for the configurations of the Embodiment 1 through 3 and the Comparative Examples 1 and 2 are shown in Table 1.

The initial charging performance is evaluated as follows. The surface potential of the photosensitive drum 21 (drum surface potential) is measured after passing through the charging brush 22 and before reaching the charging roller 23. In measurement results, the initial charging performance is determined to be good (○) if potential difference having a predetermined threshold value or more (unevenness of potential) with reference to target potential in the charging by the charging brush 22 is not observed, and the initial charging performance is determined to be inferior (×) if observed.

The effect from the foreign matter in the charging is evaluated as follows. A paper passing operation is performed in the image forming apparatus 1 provided with the charging brush 22 in the Embodiments or the Comparative Examples to output a predetermined test image. The test image is a horizontal line pattern of thin lines of a sheet widthwise direction (main scanning direction of the photosensitive drum 21) at regular intervals resulting 2% of print ratio (covered ratio by an image to an effective print area on the recording material P). In addition, the paper passing operation is performed continuously for a number of the sheets of the recording material P to an extent that the foreign matter such as the paper dust begins to accumulate in the contacting portion of the charging brush 22 and the photosensitive drum 21 (here, it is set to 200 sheets). If a black dot image of 0.3 mm or more in diameter is not observed on the output recording material P during the continuous paper passing operation, it is determined that the performance to suppress the effect from the foreign matter in the charging is good (◎). If a black spot image is observed but in a degree of no practical problem, it is determined to be acceptable (○), and if a black spot image is observed, which is practically concerned, it is determined that the performance to suppress the effect from the foreign matter in the charging is poor (×).

As for the space-saving performance, relative evaluation based on difference in the charging brush 22 itself and the configuration of the charging brush unit is performed.

TABLE 1

| | Initial charging performance | Suppression of the effect from the foreign matter in the charging | Space-saving performance |
|---|---|---|---|
| Embodiment 1 | ○ | ◎ | ○ |
| Embodiment 2 | ○ | ○ | ○ |
| Comparative Example 1 | X | ◎ | ○ |
| Comparative Example 2 | ○ | X | ○ |
| Embodiment 3 | ○ | ◎ | Δ |

As shown in part (c) of FIG. 6, in the Embodiment 1, the tips of the straight bristles 22*f* are in contact with the surface of the photosensitive drum 21 at uniform contact pressure in the straight brush portion 22F, which is positioned in the downstream side of the crimped brush portion 22G in the rotational direction R of the photosensitive drum 21. Therefore, the charging brush 22 in the Embodiment 1 can uniformly charge the surface of the photosensitive drum 21. Therefore, as for the charging brush 22 in the Embodiment 1, the initial charging performance is good.

The foreign matter D with a large size, such as the paper dust, is entangled by the crimped bristles 22*g* (crimped brush portion 22G), and the foreign matter D is prevented from entering the contacting portion of straight bristles 22*f* (straight brush portion 22F) and the photosensitive drum 21 and/or the contacting portion of the charging roller 23 and the photosensitive drum 21. When the foreign matter D becomes the lump with a certain degree, the foreign matter D collapses and falls in the direction of gravity due to the vibration of the apparatus, etc., as described above, and is accumulated in the closed space inside the charging brush unit. Therefore, deterioration in the charging performance due to the foreign matter D entering the contacting portion of the straight brush portion 22F and the photosensitive drum 21 and/or the contacting portion of the charging roller 23 and the photosensitive drum 21 is suppressed. In other words, as for the charging brush 22 in the Embodiment 1, the performance to suppress the effect from the foreign matter in the charging is good.

In the Embodiment 2, as shown in part (b) of FIG. 7, the surface of the photosensitive drum 21 is uniformly charged by the straight brush portion 22F in an initial state. Therefore, as for the charging brush 22 in the Embodiment 2, the initial charging performance is good.

In addition, in the Embodiment 2, the crimped bristles 22*g* (crimped brush portion 22G) can entangle the foreign matter D with a large size such as the paper dust. Therefore, the charging brush 22 in the Embodiment 2 can suppress the effect from the foreign matter in the charging to the degree of no practical problem.

In the Embodiment 2, however, since the crimped brush portion 22G and the straight brush portion 22F are separated, there is a case in which the falling of bristles of the crimped bristle 22*g* occurs during the paper passing operation. As a result, as shown in part (c) of FIG. 7, there is a case in which the foreign matter D with a large size enters the contacting portion of the straight brush portion 22F and the photosensitive drum 21 and/or the contacting portion of the charging roller 23 and the photosensitive drum 21 and the charging defect caused by the foreign matter D occurs. Therefore, the charging brush 22 in the Embodiment 1 can suppress the effect from the foreign matter in the charging more stably than the charging brush 22 in the Embodiment 2.

In the Comparative Example 1, as shown in part (a) of FIG. 8, an entire charging brush 22 is formed by the crimped bristles 22*g*, and width in the Y direction (widthwise direction) of the crimped brush portion 22G is wider than that in the Embodiment 2. Therefore, as shown in part (c) of FIG. 8, it is unlikely for the crimped bristles 22*g* to fall, and collecting performance of the foreign matter D is less likely to deteriorate. Therefore, as for the charging brush 22 in the Comparative Example 1, the performance to suppress the effect from the foreign matter in the charging is good.

In the Comparative Example 1, however, since the entire charging brush 22 is formed by the crimped bristles 22*g*, it is difficult to regulate the heights of end surfaces of the tips of the brush fiber, as shown in part (a) of FIG. 8. Therefore, in an initial state shown in part (b) of FIG. 8, the tips of the crimped bristles 22*g* does not contact the surface of the photosensitive drum 21 at uniform contact pressure, and it is difficult for the charging brush 22 to uniformly charge the surface of the photosensitive drum 21. Therefore, the initial charging performance of the charging brush 22 in the Comparative Example 1 is inferior to that in the Embodiment 1.

In the Comparative Example 2, as shown in part (a) of FIG. 9, an entire charging brush 22 is formed by the straight bristles 22*f*, and heights of the end surfaces of the tips of the brush fiber are regulated. As shown in part (b) of FIG. 9, in the Comparative Example 2, the surface of photosensitive drum 21 can be uniformly charged by the straight brush portion 22F in an initial state. Therefore, as for the charging brush 22 in the Comparative Example 2, the initial charging performance is good.

In the Comparative Example 2, however, since the entire charging brush 22 is formed by the straight bristles 22*f*, it is difficult to collect the foreign matter D with a large size, as shown in part (c) of FIG. 9. As a result, the foreign matter D with a large size enters the contacting portion of the straight brush portion 22F and the photosensitive drum 21 and/or the contact portion of the charging roller 23 and the photosensitive drum 21, and the charging defect caused by the foreign matter D occurs. Therefore, as for the charging brush 22 in the Comparative Example 2, the performance to suppress the effect from the foreign matter in the charging is inferior to that in the Embodiment 1.

In the Embodiment 3, as shown in part (a) of FIG. 10, while the crimped brush portion 22G and the straight brush portion 22F are separated, the width in the Y direction (widthwise direction) of the crimped brush portion 22G is wider than that in the Embodiment 2. Therefore, as in the Comparative Example 1, as shown in part (c) of FIG. 10, it is unlikely for the crimped bristles 22*g* to fall, and the collecting performance of the foreign matter D is less likely to deteriorate. Therefore, as for the charging brush 22 in the Embodiment 3, the performance to suppress the effect from the foreign matter in the charging is good.

In addition, in the Embodiment 3, as shown in part (b) of FIG. 10, the surface of the photosensitive drum 21 can be uniformly charged by the straight brush portion 22F in the initial state. Therefore, as for the charging brush 22 in the Embodiment 3, the initial charging performance is good.

In the Embodiment 3, however, the crimped brush portion 22G and the straight brush portion 22F are disposed separately, and the width in the Y direction (widthwise direction) of the crimped brush portion 22G is larger than that in the Embodiment 2. Therefore, in the Embodiment 3, a size of the charging brush 22 itself becomes larger than those in the Embodiment 1, Embodiment 2, the Comparative Example 1 and the Comparative Example 2.

In contrast, the charging brush 22 in the Embodiment 1 is disposed so that the crimped brush portion 22G and the straight brush portion 22F are in contact with each other, and the width in the Y direction (widthwise direction) of the crimped brush portion 22G is smaller than that in the Embodiment 3. In the Embodiment 1, it is unlikely for the falling of bristles to occur even if the width of the crimped brush portion 22G is short since the crimped brush portion 22G is supported by the straight brush portion 22F. Therefore, as for the charging brush 22 in the Embodiment 1, the space-saving performance is superior.

If the charging brush 22 itself is small as in the Embodiment 1, since the charging brush 22 and the charging brush unit can be downsized, material cost, etc. can be reduced. In addition, if the charging brush 22 itself is small, volume of the closed space below the charging brush 22 (the accommodating portion which accommodates the foreign matter) can be made larger, which is advantageous for extending the life of the process cartridge 20 by increasing an amount capable of accumulating the foreign matter D. In addition, it is also advantageous for downsizing the process cartridge 20 and the image forming apparatus 1 since an outer shape of the closed space (accommodating portion) can be smaller.

As described above, by using the charging brushes 22 exemplified in the Embodiments 1 through 3, it becomes possible to provide the image forming apparatus capable of both improving the uniformity of the charging and suppressing the charging defect caused by the foreign matter.

In addition, with the configurations of the charging brushes 22 exemplified in the Embodiments 1 through 3, it becomes possible to provide the charging brush which is used in the image forming apparatus and is capable of both improving the uniformity of the charging and suppressing the charging defect caused by the foreign matter.

In addition, with cartridges (process cartridge or drum cartridge) provided with the charging brushes 22 exemplified in the Embodiment 1 through 3, it becomes possible to provide the cartridge capable of both improving the uniformity of the charging and suppressing the charging defect caused by the foreign matter.

(8. Modified Examples in Ratio of the Crimped Bristles and the Straight Bristles)

In the Embodiments 1 through 3, as the brush fiber (brush bristle) of the charging brush 22, the pile yarn (22*f*, 22*g*), which is conductive fiber, is used. In the Embodiments 1 through 3, the straight bristle 22*f* (second type of fiber) is preferably conductive fiber having a resistance value in an appropriate range to properly charge the surface of the photosensitive drum 21. On the other hand, in the Embodiments 1 through 3, a main role of the crimped bristle 22*g* is to entangle the foreign matter, and it does not necessarily have conductivity. In other words, the crimped bristle 22*g* (first type of fiber) may be fiber not having conductivity, which is made of insulated material etc. not containing the conductive particles.

In addition, in the Embodiments 1 through 3, examples in which all of the brush fiber woven into the base fabric 22*e* in the first region A1 (FIG. 3) in the upstream side in the rotational direction R of the photosensitive drum 21 are the crimped bristles 22*g* are described. It is not limited thereto, but only a portion of the brush fiber woven into the first region A1 may be the crimped bristle 22*g*. In other words, in the brush fiber woven into the first region A1, the straight bristles 22*f* may be included. Even in the case in which only a portion of the brush fiber woven into the first region A1 are the crimped bristles 22*g*, the same function as the charging brushes 22 in the Embodiments 1 through 3 can be obtained by the brush fiber including the crimped bristles 22*g* being intertwined with each other and entangling the foreign matter with a large size. In other words, the brush fiber woven into the first region A1 increases the space density by being intertwined with each other and entangles the foreign matter larger than 15 μm in size, for example.

From a viewpoint of making the brush fiber woven into the first region A1 to be more densely intertwined with each other, it is preferable that 50% or more (more preferably, 75% or more) of the brush fiber woven into the first region A1 are the crimped bristles 22*g*. In other words, ratio of the first type of fiber (crimped bristle 22*g*) in the brush fiber in the first portion of the charging brush 22 is preferably 50% or more (more preferably, 75% or more).

In addition, in the Embodiments 1 through 3, examples in which all of the brush fiber woven into the base fabric 22*e* in the second region A2 (FIG. 3) in the downstream side in the rotational direction R of the photosensitive drum 21 are the straight bristles 22*f* are described. It is not limited thereto, but only a portion of the brush fiber woven into the second region A2 may be the straight bristles 22*f*. In other words, the crimped bristles 22*g* may be included in the brush fiber woven into the second region A2. Even in a case in which only a portion of the brush fiber woven into the second region A2 are the straight bristles 22*f*, the same function as the charging brushes 22 in the Embodiments 1 through 3 can be obtained by properly charging the surface of the photosensitive drum 21 with the brush fiber of which the heights of the tips are regulated. In addition, if a brush portion in the second region A2, which includes the straight bristles 22*f*, which are firmer relative to the crimped bristles 22*g*, has positional relationship in which the brush portion in the second region A2 can support a brush portion in the first region A1, which includes the crimped bristles 22*g*, it is possible to suppress the falling of bristles of the crimped bristle 22*g*.

From a viewpoint to charge the surface of the photosensitive drum 21 with the brush fiber woven into the second region A2 more appropriately, it is preferable that 80% or more (more preferably, 90% or more) of the brush fiber woven into the second region A2 are the straight bristles 22*f*. In other words, it is preferable that ratio of the second type of fiber (straight bristles 22*f*) in the brush fiber in the second portion of the charging brush 22 is preferably 80% or more (more preferably, 90% or more). If, of the brush fiber in the brush fiber woven into the second region A2, 80% or more (more preferably, 90% or more) are the straight bristles 22*f*, then it is possible to suppress the falling of bristles by supporting the brush portion in the first region A1 including the crimped bristles 22*g*.

In addition, the charging brushes 22 in the Embodiments 1 through 3 are constituted by two portions (crimped brush portion 22G and straight brush portion 22F) with different ratios of the crimped bristles 22*g* in the brush fiber. It is not limited thereto, but the charging brush 22 may include three or more portions in which ratios of the crimped bristles 22*g* in the brush fiber are different from each other. In this case, the "first portion" of the charging brush 22 refers to the most upstream portion even in the rotational direction R of the photosensitive drum 21 of the three or more portions in which the ratios of the crimped bristles 22*g* in the brush fiber are different from each other. In addition, the "second portion" of the charging brush 22 refers to the most downstream portion even in the rotational direction R of the photosensitive drum 21 of the three or more portions in which the ratios of the crimped bristles 22*g* in the brush fiber are different from each other.

In addition, the charging brush 22 may be configured so that the ratio of the crimped bristle 22*g* in the brush fiber varies continuously along the rotational direction R of the photosensitive drum 21. In this case, the "first portion" of the charging brush 22 refers to the most upstream portion of the charging brush 22 even in the rotational direction R of the photosensitive drum 21. In addition, the "second portion" of the charging brush 22 refers to the most downstream portion of the charging brush 22 even in the rotational direction R of the photosensitive drum 21.

OTHER EMBODIMENTS

In the Embodiments described above, the configurations of a direct transfer type in which the toner image (developer image) is transferred directly from the photosensitive drum 21 to the recording material P as a transferred member are exemplified, however, the image forming apparatus may be what of an intermediary transfer type provided with an intermediary transfer member. In a case of the intermediary transfer type, the image is formed on the recording material P by the toner image being primarily transferred from the photosensitive drum 21 to the intermediary transfer member such as an intermediary transfer belt and then the toner image being secondarily transferred from the intermediary transfer member to the recording material P.

According to the present invention, it becomes possible to provide the image forming apparatus capable of both improving the uniformity of the charging and suppressing the charging defect caused by the foreign matter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-182529, filed Oct. 24, 2023, which is hereby incorporated by reference herein in its entirety.

What is claimed is:

1. An image forming apparatus comprising:
- a rotatable photosensitive member; and
- a charging brush configured to form a charging portion by being in contact with a surface of the photosensitive member and to charge the surface of the photosensitive member,
- wherein the charging brush is provided with brush fiber including a first type of fiber which is crimped and a second type of fiber which is non-crimped, and
- wherein a ratio of the first type of fiber to the brush fiber in a first portion of the charging brush in a moving direction of the surface of the photosensitive member in the charging portion is higher than a ratio of the first type of fiber to the brush fiber in a second portion of the charging brush positioned further downstream than the first portion in the moving direction.

2. The image forming apparatus according to claim 1, wherein the ratio of the first type of fiber to the brush fiber in the first portion is 50% or more, and
- wherein a ratio of the second type of fiber to the brush fiber in the second portion is 80% or more.

3. The image forming apparatus according to claim 2, further comprising a flexible sheet member configured to support the charging brush,
- wherein the brush fiber is in contact with the surface of the photosensitive member by elasticity of the sheet member.

4. The image forming apparatus according to claim 1, wherein a downstream end of the first portion and an upstream end of the second portion are in contact with each other in a rotational direction of the photosensitive member.

5. The image forming apparatus according to claim 1, wherein the first portion is a first brush, and
wherein the second portion is a second brush disposed apart from the first brush in a downstream side in a rotational direction of the photosensitive member.

6. The image forming apparatus according to claim 1, wherein the charging brush includes a base fabric, and
wherein the first type of fiber and the second type of fiber are pile-woven into the base fabric.

7. The image forming apparatus according to claim 6, wherein a space between a first region, of the base fabric, where the brush fiber of the first portion is woven and a second region, of the base fabric, where the brush fiber of the second portion is woven is 2 mm or less.

8. The image forming apparatus according to claim 1, wherein the second type of fiber has conductivity.

9. The image forming apparatus according to claim 8, wherein the first type of fiber has no conductivity.

10. The image forming apparatus according to claim 1, wherein a resistance value of the charging brush is $1.0\times10^{2}\Omega$ to $1.0\times10^{8}\Omega$.

11. The image forming apparatus according to claim 1, further comprising a supporting member configured to support the charging brush, and
an urging means configured to urge the supporting member toward a direction approaching to the photosensitive member,
wherein the brush fiber is in contact with the surface of the photosensitive member by an urging force of the urging means.

12. The image forming apparatus according to claim 1, further comprising a supporting member configured to support the charging brush and fixed in a position relative to a rotational axis of the photosensitive member,
wherein a distance between the supporting member and the surface of the photosensitive member is shorter than a dimension of the charging brush in a bristle height direction of the brush fiber in a state before the charging brush is mounted on the supporting member.

13. The image forming apparatus according to claim 1, wherein as viewed in a rotational axis direction of the photosensitive member, a center position of a contacting portion of the charging brush and the photosensitive member in a rotational axis direction of the photosensitive member is disposed within a range of 30° to 150° which is an angle measured in a rotational direction of the photosensitive member with a half line drawn in a direction of gravity from a rotational axis as a reference.

14. The image forming apparatus according to claim 1, further comprising an accommodating portion provided in an upstream side of the charging brush in a rotational direction of the photosensitive member and configured to accommodate a foreign matter collected from the photosensitive member by the charging brush.

15. The image forming apparatus according to claim 1, further comprising:
an exposing unit configured to expose the photosensitive member; and
a transfer member configured to form a transfer portion by opposing the photosensitive member and to transfer a developer image formed on the photosensitive member onto a transferred member,
wherein in a rotational direction of the photosensitive member, the charging portion is disposed downstream of the transfer portion and upstream of an exposing position where a light from the exposing unit is irradiated.

16. The image forming apparatus according to claim 15, further comprising:
a developer container configured to accommodate a developer; and
a developing member configured to form a developing portion by opposing the photosensitive member and to supply the developer to the photosensitive member,
wherein the image forming apparatus is configured to collect the developer remaining on the surface of the photosensitive member after passing through the transfer portion to the developer container by the developing member, and
wherein the charging brush permits the developer to pass through a contacting portion of the charging brush and the photosensitive member.

17. The image forming apparatus according to claim 15, further comprising a charging member provided downstream of the charging portion and upstream of the exposing position in the rotational direction of the photosensitive member and configured to charge the surface of the photosensitive member.

18. The image forming apparatus according to claim 17, wherein an absolute value of a voltage applied to the charging brush is smaller than an absolute value of a voltage applied to the charging member.

19. The image forming apparatus according to claim 17, wherein the charging member is a roller.

20. The image forming apparatus according to claim 15, wherein the transferred member is a recording material on which an image is recorded.

21. The image forming apparatus according to claim 15, wherein the transferred member is an intermediary transfer member to secondarily transfer the developer image onto a recording material after the developer image is primarily transferred from the photosensitive member.

* * * * *